US012165566B2

(12) United States Patent
Kim et al.

(10) Patent No.: US 12,165,566 B2
(45) Date of Patent: Dec. 10, 2024

(54) DISPLAY DEVICE AND DISPLAY PANEL

(71) Applicant: LG Display Co., Ltd., Seoul (KR)

(72) Inventors: SunYoon Kim, Seoul (KR); Jin-Hyun Jung, Seoul (KR); Byungjae Lee, Incheon (KR); Changwoo Lee, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 18/511,490

(22) Filed: Nov. 16, 2023

(65) Prior Publication Data

US 2024/0212574 A1 Jun. 27, 2024

(30) Foreign Application Priority Data

Dec. 23, 2022 (KR) ........................ 10-2022-0183108

(51) Int. Cl.

*G09G 5/00* (2006.01)
*G09G 3/20* (2006.01)
*G09G 3/32* (2016.01)

(52) U.S. Cl.

CPC ............ *G09G 3/2096* (2013.01); *G09G 3/32* (2013.01); *G09G 2300/0426* (2013.01); *G09G 2300/0842* (2013.01); *G09G 2310/0262* (2013.01); *G09G 2310/08* (2013.01); *G09G 2320/041* (2013.01)

(58) Field of Classification Search

CPC ................... G09G 3/2096; G09G 3/32; G09G 2300/0426; G09G 2300/0842; G09G 2310/0262; G09G 2310/08; G09G 2320/041

See application file for complete search history.

(56) References Cited

U.S. PATENT DOCUMENTS

| | | | | |
|---|---|---|---|---|
| 11,521,547 | B2 * | 12/2022 | Nishiyama | G09G 3/3266 |
| 2023/0215335 | A1 * | 7/2023 | Park | G09G 3/2096 345/214 |
| 2023/0386390 | A1 * | 11/2023 | Park | G09G 3/3233 |
| 2024/0005865 | A1 * | 1/2024 | Joo | G09G 3/3241 |

* cited by examiner

*Primary Examiner* — Joe H Cheng

(74) *Attorney, Agent, or Firm* — Birch, Stewart, Kolasch & Birch, LLP

(57) ABSTRACT

Discussed are a display panel and a display device having the same. The display panel includes a plurality of subpixels. A gate line, a data line, and a reference voltage line are further disposed on the display panel. A gate driving circuit supplies a scan signal to the gate line. A data driving circuit converts image data into a data voltage and supplies the data voltages to the data line. A timing controller controls the gate driving circuit and the data driving circuit and generates compensation data for the image data using a sensing voltage detected through the reference voltage line. The display panel includes a plurality of sensing transistors disposed around a corresponding subpixel among the plurality of subpixels to connect the data line and the reference voltage line.

18 Claims, 18 Drawing Sheets

(a)

(b)

DISPLAY DEVICE AND DISPLAY PANEL

CROSS REFERENCE TO RELATED APPLICATION

This application claims priority to Korean Patent Application No. 10-2022-0183108, filed on Dec. 23, 2022 in the Republic of Korea, the entire disclosure of which is hereby expressly incorporated by reference into the present application.

BACKGROUND

Field

Embodiments of the present disclosure relate to a display device and a display panel and, more particularly, to a display device and a display panel in which the temperature of a substrate on which micro light-emitting diodes (micro LEDs) are disposed can be easily determined and compensated for.

Discussion of the Related Art

In response to the development of the information society, a demand for various types of image display devices is increasing. In this regard, a range of display devices, such as liquid crystal display (LCD) devices, organic light-emitting diode (OLED) display devices, and the like, have come into widespread use.

Among such display devices, an LCD device requires a backlight unit disposed to emit light to the bottom (or rear side) thereof, since the LCD device does not generate light by itself. However, due to the backlight unit, the thickness of the LCD device can increase. Accordingly, there can be limitations in realizing display devices having various designs such as flexible or circular designs when the LCD device is used. In addition, the luminance and response rate of the LCD device can be reduced.

A display device having self-light-emitting elements can be designed to be thinner than a display device in which a light source is disposed, and can advantageously be implemented in a flexible and foldable display device.

Such display devices having self-light-emitting elements can include an organic light-emitting display device having an organic material for a light-emitting layer, a micro LED display device using micro light-emitting diodes (micro LEDs) as light-emitting elements, and the like. Such an organic light-emitting display device can be used as a thinner display device having a wider range of shapes, since a separate light source is not required.

However, although the organic light-emitting display device including an organic material does not require a separate light source, defective pixels can be easily generated by moisture and oxygen. Thus, a variety of technological concepts for minimizing infiltration of oxygen and moisture can be additionally needed.

Thus, recently, research and development into a display device using micro LEDs having a microscopic size as light-emitting elements are underway. Such a micro LED display device has come to prominence as a next-generation display device, due to having high resolution and high reliability.

The micro LED display device can be fabricated by crystallizing micro LED devices on a semiconductor wafer substrate of sapphire or Si and moving a plurality of crystallized micro LED chips to a substrate on which driving devices are provided. Here, an elaborate transfer process of locating the micro LED chips at positions corresponding to respective pixels is used.

In addition, in the event that the micro LED display device deteriorates, a process of compensating for the micro LED display device depending on the degree of deterioration is needed. However, it can be difficult to sense the temperature of the substrate on which the micro LEDs are disposed, and thus it can be difficult to apply a compensation algorithm according to changes in temperature.

BRIEF SUMMARY OF THE DISCLOSURE

In this regard, the inventors of the present disclosure have invented a display device and a display panel in which the temperature of a substrate on which micro light-emitting diodes (micro LEDs) are disposed can be easily determined and compensated for.

Embodiments of the present disclosure can provide a display device and a display panel in which temperature sensing transistors can be disposed around respective subpixels in each of which a micro LED is disposed, such that the temperature of the substrate can be easily determined.

In addition, embodiments of the present disclosure can provide a display device and a display panel in which a temperature profile corresponding to sensing voltages detected by the temperature sensing transistors can be generated using a lookup table, such that temperature compensation can be performed effectively.

In addition, embodiments of the present disclosure can provide a display device and a display panel in which the temperature sensing transistors can be implemented using transistors sensitive to temperature changes, such that the accuracy of the temperature sensing and compensation can be improved.

Embodiments of the present disclosure can provide a display device including a display panel including a plurality of subpixels, wherein a gate line, a data line, and a reference voltage line are disposed on the display panel; a gate driving circuit supplying a scan signal to the gate line; a data driving circuit converting image data into a data voltage and supplying the data voltages to the data line; and a timing controller controlling the gate driving circuit and the data driving circuit and generating compensation data for the image data using a sensing voltage detected through the reference voltage line. The display panel can include a plurality of sensing transistors disposed around a corresponding subpixel among the plurality of subpixels to connect the data line and the reference voltage line.

Embodiments of the present disclosure can provide a display device including a gate line through which a scan signal is supplied; a data line through which a data voltage is supplied; a reference voltage line through which a reference voltage is supplied; a subpixel including a light-emitting element and a driving transistor transferring a driving current to the light-emitting element; and a plurality of sensing transistors disposed around the subpixel to connect the data line and the reference voltage line.

According to embodiments of the present disclosure, the temperature of a substrate on which micro LEDs are disposed can be easily determined and compensated for.

According to embodiments of the present disclosure, temperature sensing transistors can be disposed around respective subpixels in each of which a micro LED is disposed, such that the temperature of the substrate can be easily determined.

According to embodiments of the present disclosure, a temperature profile corresponding to sensing voltages detected by the temperature sensing transistors can be generated using a lookup table, such that temperature compensation can be performed effectively.

According to embodiments of the present disclosure, the temperature sensing transistors can be implemented using transistors sensitive to temperature changes, such that the accuracy of the temperature sensing and compensation can be improved.

BRIEF DESCRIPTION OF THE DRAWINGS

The above and other objectives, features, and advantages of the present disclosure will be more clearly understood from the following detailed description, taken in conjunction with the accompanying drawings, in which.

DETAILED DESCRIPTION OF THE EMBODIMENTS

Figure 1:
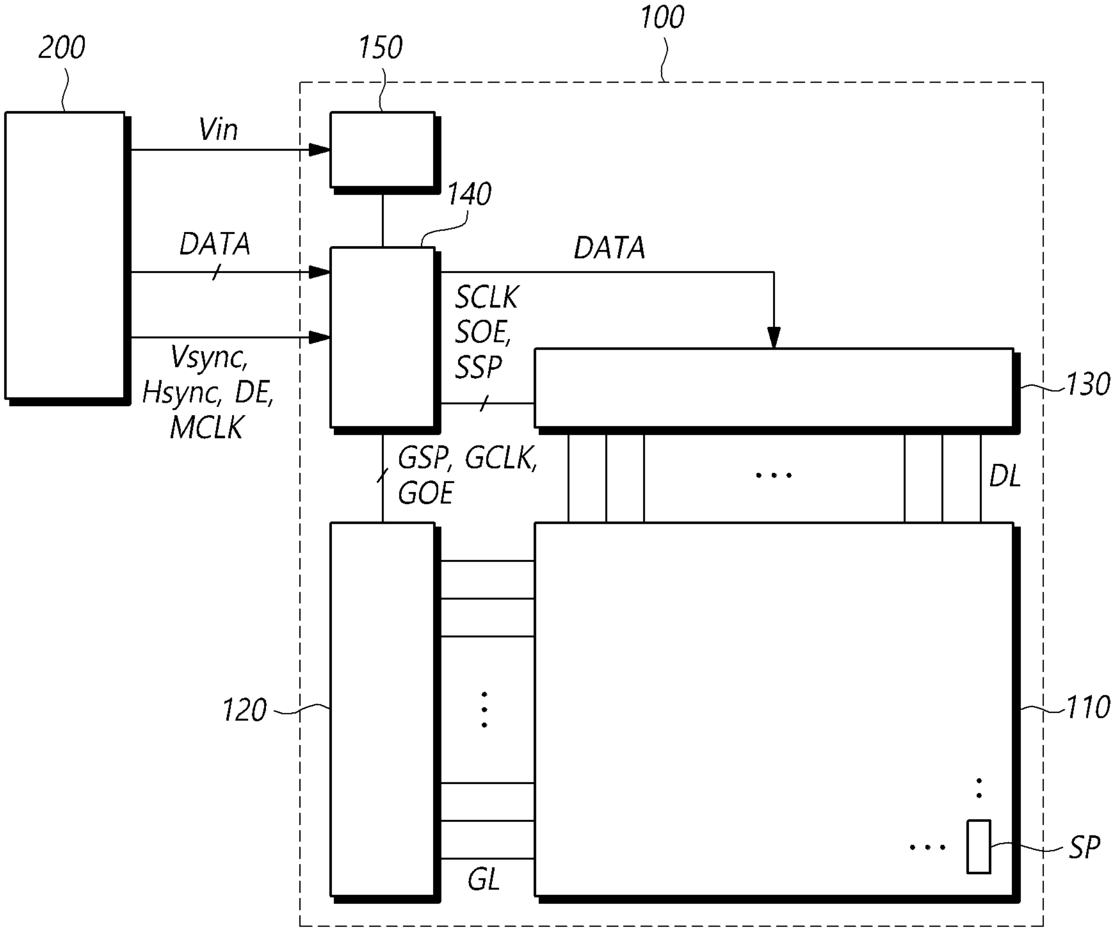
FIG. 1 is a diagram illustrating a schematic configuration of a display device according to embodiments of the present disclosure.

Hereinafter, some embodiments of the present disclosure will be described in detail with reference to exemplary drawings. In the following description of examples or embodiments of the present invention, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the present invention, detailed descriptions of well-known functions and components incorporated herein will be omitted when it is determined that the description can make the subject matter in some embodiments of the present invention rather unclear. The terms such as "including", "comprising", "having", "containing", "constituting" "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" can be used herein to describe elements of the present invention. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element can be included in at least one of two or more elements that "are connected or coupled to", "contact or overlap", etc. each other.

When time relative terms, such as "after", "subsequent to", "next", "before", and the like, are used to describe processes or operations of elements or configurations, or flows or steps in operating, processing, manufacturing methods, these terms can be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that can be caused by various factors (e.g., process factors, internal or external impact, noise, etc.) even when a relevant description is not specified. Further, the term "may" fully encompasses all the meanings of the term "can".

Hereinafter, various embodiments of the present disclosure will be described in detail with reference to the accompanying drawings. All the components of each display device according to all embodiments of the present disclosure are operatively coupled and configured.

FIG. 1 is a diagram illustrating a schematic configuration of a display device according to embodiments of the present disclosure.

Referring to FIG. 1, a display device 100 according to the embodiments of the present disclosure can include a display panel 110 with a plurality of gate lines GL and a plurality of data lines DL crossing each other thereon and having a plurality of subpixels SP arranged in a matrix or other configuration; a gate driving circuit 120 for driving the plurality of gate lines GL; a data driving circuit 130 for supplying data voltages to the display panel 110 through the plurality of data lines DL; a timing controller 140 for controlling the gate driving circuit 120 and the data driving circuit 130; and a power management circuit 150.

The display panel 110 displays images in accordance with a scan signal transferred from the gate driving circuit 120 through the plurality of gate lines GL and a data voltage transferred from the data driving circuit 130 through the plurality of data lines DL.

In the display panel 110, a plurality of pixels can be arranged in a matrix or other configuration. Each of the pixels can be composed of subpixels SP of different colors, for example, a white subpixel, a red subpixel, a green subpixel, and a blue subpixel, or a red subpixel, a green subpixel and a blue subpixel. Other variations for the pixels are possible. Each of the plurality of subpixels SP can be defined by the plurality of data lines DL and the plurality of gate lines GL.

Each single subpixel SP can include a thin film transistor (TFT) formed in an area in which a single data line DL and a single gate line GL intersect each other, a light-emitting element, such as a micro light-emitting diode (micro LED), generating light in response to the data voltage, a storage capacitor electrically connected to the light-emitting element to maintain the voltage, and the like.

When the display device 100 having, for example, a resolution of 2,160×3,840 is comprised of three types of subpixels SP such as red (R), green (G), and blue (B) subpixels, there can be 2,160 gate lines GL and a total of 11,520 (=3,840×3) data lines DL, due to 3,840 data lines DL respectively connected to three (RGB) subpixels. A subpixel SP can be disposed at a point at which a gate line GL and a data line DL intersect each other.

The gate driving circuit 120 is controlled by the controller 140. The controller 140 controls driving timing of the plurality of subpixels SP by sequentially outputting the scan signal to the plurality of gate lines GL disposed on the display panel 110.

In the display device 100 having a resolution of 2,160×3,840, sequentially outputting the scan signal to the 2,160 gate lines GL from the first gate line to the 2,160$^{th}$ gate line can be referred to as 2,160-phase driving. Alternatively, sequentially outputting the scan signal to four respective gate lines, for example, sequentially outputting the scan signal to the first to fourth gate lines and then sequentially outputting the scan signal to the fifth to eighth gate lines, can be referred to as four-phase driving. For example, sequentially outputting the scan signal for N number of respective gate lines GL can be referred to as N-phase driving.

Here, the gate driving circuit 120 can include one or more gate driving integrated circuits GDIC. The gate driving circuit 120 can be located on one side or both sides of the display panel 110 depending on the driving method. Alternatively, the gate driving circuit 120 can be implemented using a gate-in-panel (GIP) structure disposed inside the bezel area of the display panel 110.

The data driving circuit 130 receives image data DATA from the timing controller 140 and converts the received image data DATA into analog data voltages. Afterwards, the data driving circuit 130 outputs the data voltages to the data lines DL, respectively, at timing at which the scan signal is applied through the gate lines GL, and respective subpixels SP connected to the data lines DL generate light signals corresponding to the data voltages.

In the same manner, the data driving circuit 130 can include one or more source driving integrated circuits SDIC. The source driving integrated circuits can be connected to bonding pads of the display panel 110 using a tape-automated-bonding (TAB) structure or a chip-on-glass (COG) structure or be directly disposed on the display panel 110.

In some cases, each of the source driving integrated circuits can be integrated into the display panel 110. In addition, each of the source driving integrated circuits can be implemented using a chip-on-film (COF) structure. In this case, each of the source driving integrated circuits can be mounted on a circuit film and electrically connected to the corresponding data line DL of the display panel 110 through the circuit film.

The timing controller 140 supplies a variety of control signals to the gate driving circuit 120 and the data driving circuit 130 and controls the operations of the gate driving circuit 120 and the data driving circuit 130. For example, the timing controller 140 controls the gate driving circuit 120 to output the scan signal at timing defined for respective frames, and transfers the image data DATA received from an external source to the data driving circuit 130.

Here, the timing controller 140 receives timing signals including a vertical synchronization signal Vsync, a horizontal synchronization signal Hsync, a data enable signal DE, and a main clock MCLK, as well as the image data DATA, from an external host system 200.

The host system 200 can be one of a television (TV), a set-top box, a navigation system, a personal computer (PC), a home theatre system, a mobile device, a wearable device, and the like, or any other device or element that can be associated with the display device 100.

Thus, the timing controller 140 generates control signals using a variety of timing signals received from the host system 200 and transfers the control signals to the gate driving circuit 120 and the data driving circuit 130.

For example, the timing controller 140 outputs a variety of gate control signals including a gate start pulse GSP, a gate clock GCLK, a gate output enable signal GOE, and the like in order to control the gate driving circuit 120. Here, the gate start pulse GSP controls timing at which the one or more gate driving integrated circuits of the gate driving circuit 120 start operating. In addition, the gate clock GCLK is a clock signal input to the one or more gate driving integrated circuits in common, and controls shift timing of the scan signal. In addition, the gate output enable signal GOE designates timing information of the one or more gate driving integrated circuits.

In addition, the timing controller 140 outputs a variety of data control signals including a source start pulse SSP, a source clock SCLK, a source output enable signal SOE, and the like in order to control the data driving circuit 130. Here, the source start pulse SSP controls timing at which the one or more source driving integrated circuits of the data driving circuit 130 start data sampling. The source clock SCLK is a clock signal to control timing at which the source driving integrated circuits sample data. The source output enable signal SOE controls output timing of the data driving circuit 130.

The display device 100 can include the power management circuit 150 supplying a variety of voltages or currents to the display panel 110, the gate driving circuit 120, the data driving circuit 130, and the like or controlling the variety of voltages or currents to be supplied.

The power management circuit 150 generates power required to drive the display panel 110, the gate driving circuit 120, and the data driving circuit 130 by adjusting a DC input voltage Vin supplied from the host system 200.

In addition, the subpixels SP are located at points at which the gate lines GL intersect the data lines DL, and the light-emitting elements can be disposed in the subpixels SP, respectively. For example, a micro LED display device includes light-emitting elements, such as micro LEDs, in the subpixels, respectively. The micro LED display device can display images by controlling current flowing through the light-emitting elements according to data voltages.

The display device 100 can be a variety of displays including a micro LED display, an LCD, an organic light-emitting display, a plasma display panel, and the like.

Figure 2:
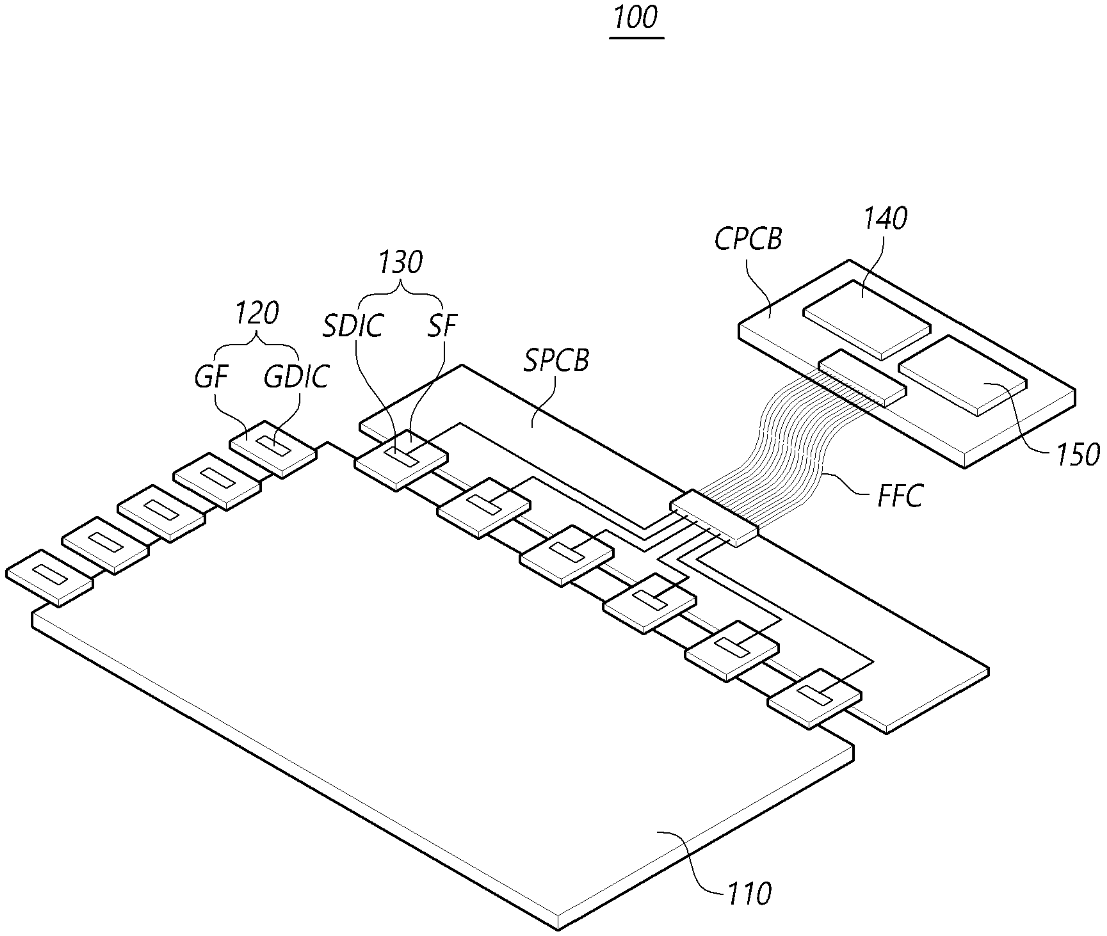
FIG. 2 is an example diagram illustrating a system of the display device according to embodiments of the present disclosure.

FIG. 2 is an example diagram illustrating a system of the display device according to embodiments of the present disclosure.

Referring to FIG. 2, the display device 100 according to the embodiments is an example in which the source driving integrated circuits SDIC of the data driving circuit 130 and the gate driving integrated circuits GDIC of the gate driving circuit 120 are implemented using a COF structure from among a variety of structures such as TAB, COG, and COF.

The one or more gate driving integrated circuits GDIC included in the gate driving circuit 120 can be disposed on gate films GF, respectively. One side of each of the gate films GF can be electrically connected to the display panel 110. In addition, conductive lines electrically connecting the gate driving integrated circuits GDIC to the display panel 110 can be disposed on the gate films GF.

In the same manner, the one or more source driving integrated circuits SDIC included in the data driving circuit 130 can be mounted on source films SF, respectively. One side of each of the source films SF can be electrically connected to the display panel 110. In addition, conductive lines electrically connecting the source driving integrated circuits SDIC to the display panel 110 can be disposed on the source films SF.

The display device 100 can include at least one source printed circuit board SPCB and a control printed circuit board CPCB for circuit connection of the plurality of source driving integrated circuits SDIC to other devices. Here, control components and a variety of electrical devices are mounted on the control printed circuit board CPCB.

Here, the other sides of the source films SF on which the source driving integrated circuits SDIC are mounted, respectively, can be connected to the at least one source printed circuit board SPCB. For example, each of the source films SF on which the source driving integrated circuits SDIC are mounted can be configured such that one side thereof is electrically connected to the display panel 110 and the other side thereof is electrically connected to the source printed circuit board SPCB.

The timing controller 140 and the power management circuit 150 can be mounted on the control printed circuit board CPCB. The timing controller 140 can control the operations of the data driving circuit 130 and the gate driving circuit 120. The power management circuit 150 can supply drive voltages or currents to the display panel 110, the data driving circuit 130, the gate driving circuit 120, and the like and control supplied voltages or currents.

The at least one source printed circuit board SPCB and the control printed circuit board CPCB are circuit-connected through at least one connecting member. The connecting member can be a flexible flat cable FFC. The connecting member can also be, for example, a flexible printed circuit (FPC) or the like. Here, the connecting member connecting the at least one source printed circuit board SPCB and the control printed circuit board CPCB can be modified variously depending on the size and type of the display device 100. In addition, the at least one source printed circuit board SPCB and the control printed circuit board CPCB can be integrated into a single printed circuit board.

In the display device 100 having the above-described configuration, the power management circuit 150 transfers drive voltages required for display driving or characteristic values sensing to the source printed circuit board SPCB through the flexible flat cable FFC or the flexible printed circuit. The drive voltage transferred to the source printed circuit board SPCB is supplied to light or sense specific subpixels SP in the display panel 110.

Here, each of the subpixels SP arranged in the display panel 110 of the display device 100 can include a micro LED, i.e., a light-emitting element, and a circuit device, such as a driving transistor, for driving the micro LED.

The type and number of circuit devices in each of the subpixels SP can be determined variously depending on functions to be provided, designs, and the like.

Figure 3:
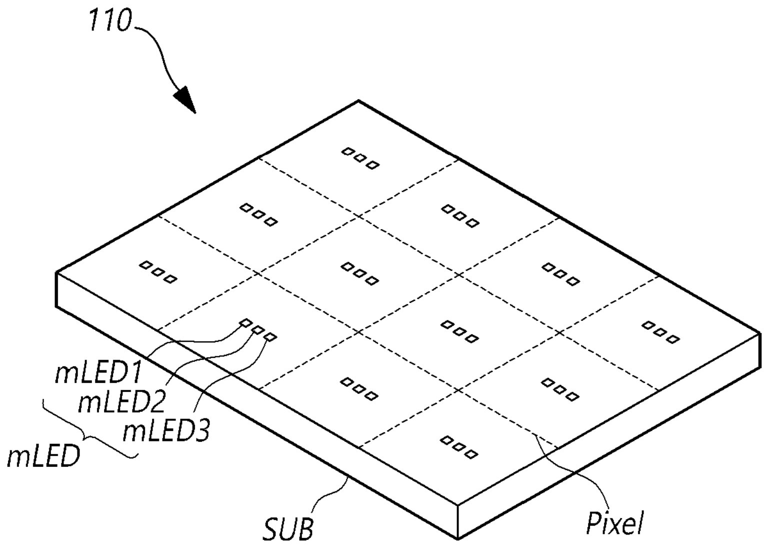
FIG. 3 is a plan diagram schematically illustrating the display panel according to embodiments of the present disclosure.

FIG. 3 is a plan diagram schematically illustrating the display panel according to embodiments of the present disclosure.

Referring to FIG. 3, the display panel 110 according to the embodiments can include a substrate SUB and a plurality of micro LEDs mLED mounted on the substrate SUB.

The substrate SUB can be formed of a transparent material such as glass, and a plurality of pixels Pixel can be formed on the substrate SUB. In each of the pixels Pixel, a plurality of micro LEDs mLED (mLED1, mLED2, and mLED3), a plurality of transistors for driving the micro LEDs mLED, and signal lines can be provided.

The display panel 110 display images by generating light from the micro LEDs mLED in response to data voltages applied through the data lines DL in a state in which the driving transistors for driving the micro LEDs mLED are turned on.

In this regard, three micro LEDs mLED1, mLED2, and mLED3 each generating monochromatic light, i.e., red, green, or blue light, can be disposed in each of the pixels Pixel of the substrate SUB. Each of the micro LEDs mLED1, mLED2, and mLED3 generates light having a corresponding color in response to the data voltage.

Here, an area in which a red micro LED mLED1, a green micro LED mLED2, or a blue micro LED mLED3 is located can be a subpixel SP. Thus, a single pixel Pixel can include a red subpixel, a green subpixel, and a blue subpixel.

The micro LEDs mLED1, mLED2, and mLED3 provided on the display panel 110 can be fabricated by a separate process from a fabrication process of the transistors in the substrate SUB.

For example, in the micro LED display device 100, transistors and a variety of conductive lines disposed on the substrate SUB are formed by a photolithography process, but the micro LEDs mLED1, mLED2, and mLED3 are fabricated in a separate process. The separately-fabricated micro LEDs mLED1, mLED2, and mLED3 can be transferred to the substrate SUB.

The micro LEDs mLED are light-emitting diodes having a size of 10 to 100 μm. The micro LEDs can be formed by growing a thin film of an inorganic material, such as Al, Ga, N, P, As, or In, on a sapphire or Si substrate and then cutting the sapphire or Si substrate. Since the micro LEDs mLED are formed in a microscopic size, the micro LEDs mLED can be transferred to a flexible substrate formed of, for example, plastic, thereby enabling a flexible display device to be fabricated. In addition, since the micro LEDs mLED are formed by growing an inorganic material different from an organic light-emitting layer, the fabrication process is simple and the yield can be improved.

In addition, since the individually-divided micro LEDs mLED are transferred to the large substrate SUB, the fabrication of a large display device is facilitated. The micro LEDs mLED formed of an inorganic material are advantageous in terms of high luminosity, long life span, and low fabrication costs, as compared to light-emitting elements formed of an organic material.

Figure 4:
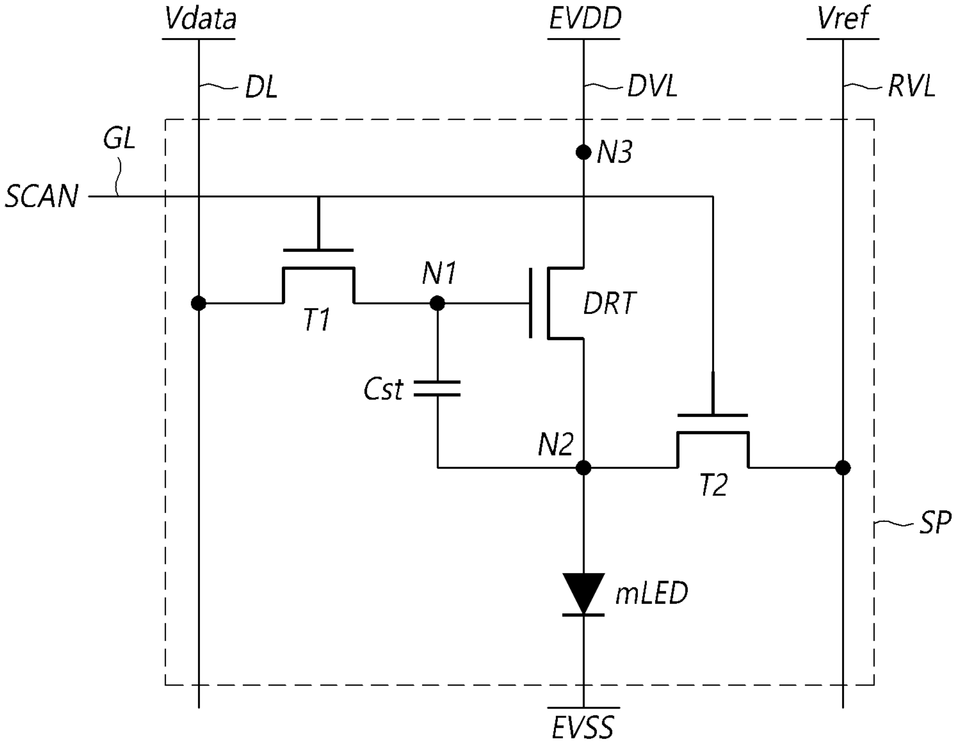
FIG. 4 is an example diagram illustrating a single subpixel circuit in the display device according to embodiments of the present disclosure.

FIG. 4 is an example diagram illustrating a single subpixel circuit in the display device according to embodiments of the present disclosure.

Here, the subpixel SP can be one of a red subpixel, a green subpixel, and a blue subpixel.

Referring to FIG. 4, in the display device 100 according to the embodiments, a single subpixel circuit can include a plurality of transistors T1, T2, and DRT and a capacitor Cst, and a micro LED mLED can be disposed as a light-emitting element.

For example, the subpixel circuit can include a driving transistor DRT, a first switching transistor T1, a second switching transistor T2, a storage capacitor Cst, and a micro LED mLED.

The driving transistor DRT has a first node N1, a second node N2, and a third node N3. The first node N1 of the driving transistor DRT can be a gate node to which a data voltage Vdata is applied from the data driving circuit 130 through a data line DL when the first switching transistor T1 is turned on. The second node N2 of the driving transistor DRT can be electrically connected to an anode of the micro LED mLED, and can be a source node or a drain node. The third node N3 of the driving transistor DRT can be electrically connected to a drive voltage line DVL to which a drive voltage EVDD is applied, and can be a drain node or a source node.

Here, in a display driving period, the drive voltage EVDD required for displaying an image can be supplied to the drive voltage line DVL. For example, the drive voltage EVDD required for displaying an image can be 27V.

The first switching transistor T1 is electrically connected to the first node N1 of the driving transistor DRT and the data line DL. A gate line GL is connected to the gate node, and the first switching transistor T1 operates in response to a scan signal SCAN supplied through the gate line GL. In addition, when the first switching transistor T1 is turned on, the first switching transistor T1 transfers the data voltage Vdata supplied through the data line DL to the gate node of the driving transistor DRT, thereby controlling the operation of the driving transistor DRT.

The second switching transistor T2 is electrically connected to the second node N2 of the driving transistor DRT and a reference voltage line RVL. The gate line GL is connected to the gate node, and the second switching transistor T2 operates in response to the scan signal SCAN supplied through the gate line GL. When the second switching transistor T2 is turned on, the second switching transistor T2 can transfer a reference voltage Vref to the second node N2 of the driving transistor DRT through the reference voltage line RVL or detect a voltage on the second node N2 of the driving transistor DRT through the reference voltage line RVL.

For example, the voltage of the first node N1 and the voltage of the second node N2 of the driving transistor DRT can be controlled by controlling the first switching transistor T1 and the second switching transistor T2, thereby allowing a drive current to be supplied to drive the micro LED mLED.

The gate node of the first switching transistor T1 and the gate node of the second switching transistor T2 can be connected to a single gate line GL in common or to different gate lines GL. Here, a structure in which the first switching transistor T1 and the second switching transistor T2 are connected to the single gate line GL is illustrated as an example. Alternatively, when the first switching transistor T1 and the second switching transistor T2 are connected to different gate lines GL, the first switching transistor T1 and the second switching transistor T2 can be independently controlled by the scan signal SCAN transferred through different gate lines GL.

In addition, the transistors disposed in the subpixel SP can be not only n-type transistors but also p-type transistors. Here, the transistors are illustrated as being n-type transistors as an example.

The storage capacitor Cst is electrically connected to the first node N1 and the second node N2 of the driving transistor DRT, and maintains the data voltage Vdata during one frame.

The storage capacitor Cst can be connected to the first node N1 and the third node N3 of the driving transistor DRT depending on the type of the driving transistor DRT. The anode of the micro LED mLED can be electrically connected to the second node N2 of the driving transistor DRT, and a base voltage EVSS can be applied to a cathode of the micro LED mLED.

Here, the base voltage EVSS can be a ground voltage or a voltage higher or lower than the ground voltage. In addition, the base voltage EVSS can vary depending on the driving state. For example, the base voltage EVSS at the time of display driving and the base voltage EVSS at the time of sensing driving can be set differently.

The structure of the subpixel circuit described above as an example is a 3T1C structure comprised of three transistors and one capacitor, which is provided for illustrative purposes only, and can further include one or more transistors or, in some cases, one or more capacitors. Alternatively, the plurality of subpixels SP can have the same structure, and some of the plurality of subpixels SP can have different structures.

In the display device 100 according to the present disclosure, a plurality of sensing transistors are disposed around the subpixel SP to determine temperatures, and temperature compensation for the display panel 110 can be performed using sensing voltages detected by the plurality of sensing transistors.

Figure 5:
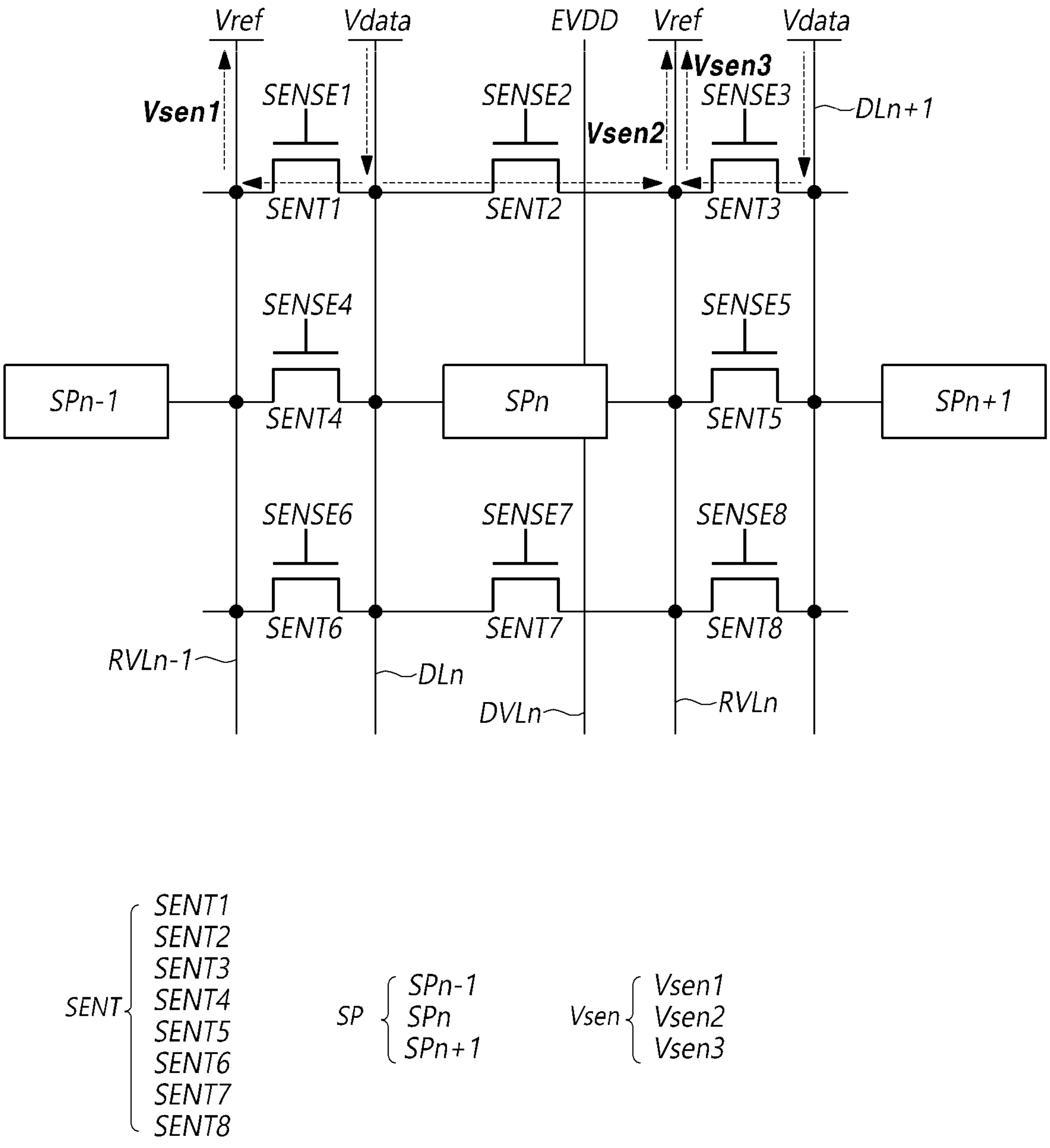
FIG. 5 is an example diagram illustrating a temperature sensing structure in the display panel of the display device according to embodiments of the present disclosure.

FIG. 5 is an example diagram illustrating a temperature sensing structure in the display panel of the display device according to embodiments of the present disclosure.

Referring to FIG. 5, in the display panel 110 of the display device 100 according to the embodiments, one or more sensing transistors SENT can be disposed around respective subpixels SP or in areas between the subpixels SP to sense temperatures.

Each of the subpixels SP can include a micro LED mLED, a driving transistor DRT, one or more switching transistors configured to be switched by a scan signal SCAN, and a storage capacitor Cst as components of a subpixel circuit.

Here, a structure in which first to eighth sensing transistors SENT1 to SENT8 are disposed to sense temperatures around an nth subpixel SPn is illustrated as an example.

For example, the first to eighth sensing transistors SENT1 to SENT8 can be disposed at eight positions, i.e., the upper left, the upper center, the upper right, the left, the right, the lower left, the lower center, and the lower right, with respect to the nth subpixel SPn in order to sense temperatures around the nth subpixel SPn.

Even when the same data voltage Vdata is applied through a data line DL, a sensing voltage Vsen detected by a sensing transistor SENT can vary depending on the temperature of the display panel 110. Due to these characteristics, the display device 100 according to the present disclosure can determine the temperature of a specific position and compensate for the temperature.

Thus, in the display device 100 according to the present disclosure, the sensing transistors SENT for sensing temperatures can be connected to data lines DL to which the data voltage Vdata is applied and reference voltage lines RVL for detecting the data voltage Vdata.

The gate nodes of the first to eighth sensing transistors SENT1 to SENT8 disposed in areas around the nth subpixel SPn can be applied with different first to eighth sense signals SENSE1 to SENSE8. Thus, the first to eighth sensing transistors SENT1 to SENT8 can detect a sensing voltage Vsen through the reference voltage lines RVL at positions at which the first to eighth sensing transistors SENT1 to SENT8 are disposed by individually controlling first to eighth sense signals SENSE1 to SENSE8.

In contrast, temperatures of two or more positions can be sensed at the same time by simultaneously controlling some sensing transistors from among the first to eighth sensing transistors SENT1 to SENT8 in response to a single sense signal.

For example, in the first sensing transistor SENT1 located at the upper left with respect to the nth subpixel SPn, the first node (e.g., the drain node) can be connected to an nth data line DLn, and the second node (e.g., the source node) can be connected to an (n−1)th reference voltage line RVLn−1. The first sensing transistor SENT1 can be on-off controlled by the first sense signal SENSE1 applied to the gate node.

At the position at which the first sensing transistor SENT1 is disposed, the reference voltage line RVL adjacent to the nth data line DLn is the (n−1)th reference voltage line RVLn−1. Thus, the first sensing transistor SENT1 can connect the nth data line DLn and the (n−1)th reference voltage line RVLn−1.

When the first sensing transistor SENT1 is turned on by the first sense signal SENSE1, the data voltage Vdata applied through the nth data line DLn is transferred to the (n−1)th reference voltage line RVLn−1 through the first sensing transistor SENT1. Thus, with respect to the position at which the first sensing transistor SENT1 is disposed, a change in the data voltage Vdata according to the temperature can be detected using a first sensing voltage Vsen1 detected through the (n−1)th reference voltage line RVLn−1.

In addition, in the second sensing transistor SENT2 located at the upper center with respect to the nth subpixel SPn, the first node (e.g., the drain node) can be connected to the nth data line DLn, and the second node (e.g., the source node) can be connected to the nth reference voltage line RVLn. The second sensing transistor SENT2 can be on-off controlled by a second sense signal SENSE2 applied to the gate node.

At the position at which the second sensing transistor SENT2 is disposed, the reference voltage line RVL adjacent to the nth data line DLn is the nth reference voltage line RVLn, and thus the second sensing transistor SENT2 can connect the nth data line DLn and the nth reference voltage line RVLn.

When the second sensing transistor SENT2 is turned on by the second sense signal SENSE2, the data voltage Vdata applied through the nth data line DLn is transferred to the nth reference voltage line RVLn through the second sensing transistor SENT2. Thus, with respect to the position at which the second sensing transistor SENT2 is disposed, a change in the data voltage Vdata according to the temperature can be detected using a second sensing voltage Vsen2 detected through the nth reference voltage line RVLn.

In addition, in the third sensing transistor SENT3 located at the upper right with respect to the nth subpixel SPn, the first node (e.g., the drain node) can be connected to an (n+1)th data line DLn+1, and the second node (e.g., the source node) can be connected to an nth reference voltage line RVLn. The third sensing transistor SENT3 can be on-off controlled by a third sense signal SENSE3 applied to the gate node.

At the position at which the third sensing transistor SENT3 is disposed, the (n+1)th data line DLn+1 and the nth reference voltage line RVLn are adjacent to each other, and thus the third sensing transistor SENT3 can connect the (n+1)th data line DLn+1 and the nth reference voltage line RVLn.

When the third sensing transistor SENT3 is turned on by the third sense signal SENSE3, the data voltage Vdata applied through the (n+1)th data line DLn+1 is transferred to the nth reference voltage line RVLn through the third sensing transistor SENT3. Thus, with respect to the position at which the third sensing transistor SENT3 is disposed, a change in the data voltage Vdata according to the temperature can be detected using a third sensing voltage Vsen3 detected through the nth reference voltage line RVLn.

As described above, in the display device 100 according to the present disclosure, the sensing transistors SENT connecting the data lines DL and the reference voltage lines RVL are disposed around the subpixels SP, and a temperature profile of the display panel 110 can be obtained using sensing voltages Vsen detected from the reference voltage lines RVL by controlling the sensing transistors SENT.

Here, a stricture in which adjacent left and right sensing transistors SENT share a data line DL or a reference voltage line RVL disposed at the center is illustrated as an example.

When the adjacent sensing transistors SENT share a data line DL or a reference voltage line RVL disposed at the center, sensing voltages Vsen at specific positions can be respectively detected by independently controlling sense signals SENSE controlling the respective sensing transistors SENT.

In contrast, sensing transistors SENT for detecting the temperature of the display panel 110 are disposed in subpixels SP, respectively. The sensing transistors SENT can be disposed to be electrically separated from adjacent subpixels SP.

Figure 6:
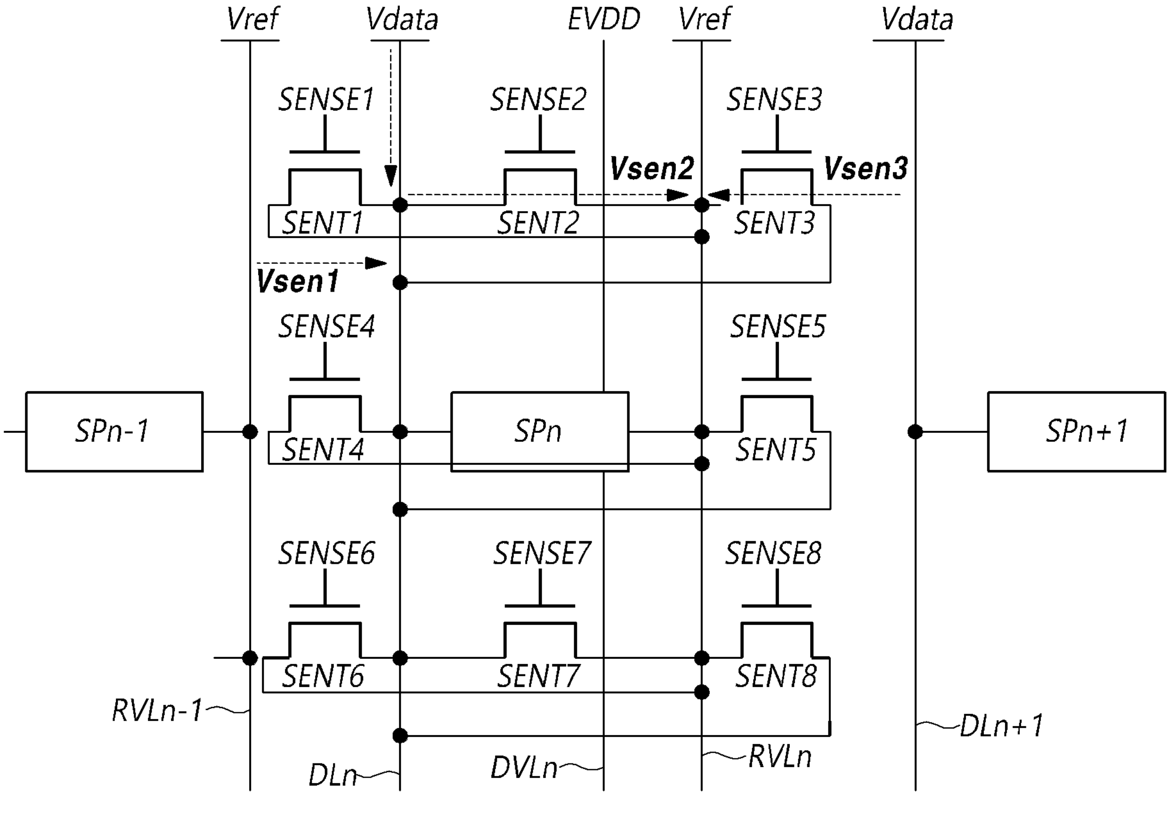
FIG. 6 is an example diagram illustrating a structure in which sensing transistors for sensing temperatures are disposed in subpixels, respectively and independently, in the display panel of the display device according to embodiments of the present disclosure.

FIG. 6 is an example diagram illustrating a structure in which sensing transistors for sensing temperatures are disposed in subpixels, respectively and independently, in the display panel of the display device according to embodiments of the present disclosure.

Referring to FIG. 6, in the display device 100 according to the embodiments, the sensing transistors SENT for detecting the temperature of the display panel 110 can be disposed independently in surrounding areas of each of the subpixels SP.

Each of the subpixels SP can include a micro LED mLED, a driving transistor DRT, one or more switching transistors configured to be switched by a scan signal SCAN, and a storage capacitor.

Here, a structure in which the first to eighth sensing transistors SENT1 to SENT8 are disposed to sense temperatures around the nth subpixel SPn is illustrated as an example.

For example, the first to eighth sensing transistors SENT1 to SENT8 can be disposed at eight positions, i.e., the upper left, the upper center, the upper right, the left, the right, the lower left, the lower center, and the lower right, with respect to the nth subpixel SPn in order to sense temperatures around the nth subpixel SPn.

Even when the same data voltage Vdata is applied through a data line DL, a sensing voltage Vsen detected by a sensing transistor SENT can vary depending on the temperature of the display panel 110. Due to these characteristics, the display device 100 according to the present disclosure can determine the temperature of a specific position and compensate for the temperature.

Thus, in the display device 100 according to the present disclosure, the sensing transistors SENT for sensing temperatures can be disposed to connect data lines DL to which the data voltage Vdata is applied and reference voltage lines RVL for detecting the data voltage Vdata.

For example, the first to eighth sensing transistors SENT1 to SENT8 can be disposed in areas around the nth subpixel SPn.

The first to eighth sensing transistors SENT1 to SENT8 can be disposed to connect the nth data line DLn for applying the data voltage Vdata to the nth subpixel SPn and the nth reference voltage line RVLn for applying the reference voltage Vref to the nth subpixel SPn.

First to eighth sense signals SENSE1 to SENSE8 can be applied to the gate nodes of different first to eighth sensing transistors SENT1 to SENT8. Thus, the first to eighth sensing transistors SENT1 to SENT8 can detect a sensing voltage Vsen through the reference voltage lines RVL at positions at which the first to eighth sensing transistors SENT1 to SENT8 are disposed by individually controlling first to eighth sense signals SENSE1 to SENSE8.

For example, in the first sensing transistor SENT1 located at the upper left with respect to the nth subpixel SPn, the first node (e.g., the drain node) can be connected to the nth data line DLn, and the second node (e.g., the source node) can be connected to the nth reference voltage line RVLn. The first sensing transistor SENT1 can be on-off controlled by the first sense signal SENSE1 applied to the gate node.

When the first sensing transistor SENT1 is turned on by the first sense signal SENSE1, the data voltage Vdata applied through the nth data line DLn is transferred to the nth reference voltage line RVLn through the first sensing transistor SENT1. Thus, with respect to the position at which the first sensing transistor SENT1 is disposed, a change in the data voltage Vdata according to the temperature can be detected using a first sensing voltage Vsen1 detected through the nth reference voltage line RVLn.

In addition, in the second sensing transistor SENT2 located at the upper center with respect to the nth subpixel SPn, the first node (e.g., the drain node) can be connected to the nth data line DLn, and the second node (e.g., the source node) can be connected to the nth reference voltage line RVLn. The second sensing transistor SENT2 can be on-off controlled by a second sense signal SENSE2 applied to the gate node.

When the second sensing transistor SENT2 is turned on by the second sense signal SENSE2, the data voltage Vdata applied through the nth data line DLn is transferred to the nth reference voltage line RVLn through the second sensing transistor SENT2. Thus, with respect to the position at which the second sensing transistor SENT2 is disposed, a change in the data voltage Vdata according to the temperature can be detected using a second sensing voltage Vsen2 detected through the nth reference voltage line RVLn.

In addition, in the third sensing transistor SENT3 located at the upper right with respect to the nth subpixel SPn, the first node (e.g., the drain node) can be connected to the nth data line DLn, and the second node (e.g., the source node) can be connected to the nth reference voltage line RVLn. The third sensing transistor SENT3 can be on-off controlled by a third sense signal SENSE3 applied to the gate node.

When the third sensing transistor SENT3 is turned on by the third sense signal SENSE3, the data voltage Vdata applied through the nth data line DLn is transferred to the nth reference voltage line RVLn through the third sensing transistor SENT3. Thus, with respect to the position at which the third sensing transistor SENT3 is disposed, a change in the data voltage Vdata according to the temperature can be detected using a third sensing voltage Vsen3 detected through the nth reference voltage line RVLn.

As described above, in the display device 100 according to the present disclosure, the sensing transistors SENT connecting the data lines DL and the reference voltage lines RVL are disposed around the subpixels SP, and a temperature profile of the display panel 110 can be obtained using sensing voltages Vsen detected from the reference voltage lines RVL by controlling the sensing transistors SENT.

Figure 7:
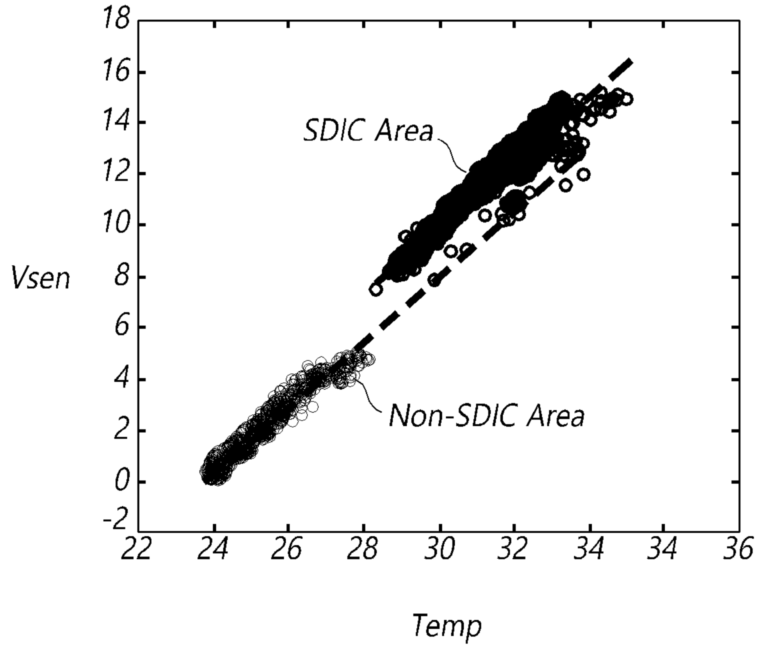
FIG. 7 is a graph illustrating changes in voltage according to the temperature of the display panel detected through a reference voltage line in the display device according to embodiments of the present disclosure.

FIG. 7 is a graph illustrating changes in voltage according to the temperature of the display panel detected through a reference voltage line in the display device according to embodiments of the present disclosure.

Referring to FIG. 7, in the display device 100 according to the embodiments, it can be viewed that when the voltage Vdata having a predetermined level is supplied through data lines DL, the sensing voltage Vsen detected through the reference voltage line RVL vary depending on the temperature of the display panel 110.

Here, the sensing voltage Vsen detected through the reference voltage line RVL is proportional to the temperature of the display panel 110.

Thus, in the display device 100 according to the present disclosure, a temperature distribution at a corresponding position can be viewed by supplying the data voltage Vdata having a predetermined level through the data line DL and detecting the sensing voltage Vsen transferred through the reference voltage line RVL according to the position of the sensing transistor SENT.

For example, the timing controller 140 compares the sensing voltage Vsen detected at a specific position of the display panel 110 through the reference voltage line RVL with reference data stored in a memory system, thereby determining a temperature value at the corresponding position. Then, compensation data Data_comp for compensating for image data DATA is generated by applying a temperature compensation factor corresponding to the temperature value.

The data driving circuit 130 can improve image quality by converting the compensation data Data_comp transferred from the timing controller 140 into an analog data voltage Vdata and supplying the analog data voltage Vdata to the display panel 110.

In addition, the temperature change of the display panel 110 can vary depending on an area SDIC Area adjacent to a source driving integrated circuit SDIC of the data driving circuit 130 and an area Non-SDIC Area located away from the source driving integrated circuit SDIC.

For example, when the data driving circuit 130 is located above the display panel 110, the temperature change in the upper portion of the display panel 110 can be greater than the temperature change in the bottom portion of the display panel. As a result, the sensing voltage Vsen detected at the upper portion of the display panel 110 through the sensing transistor SENT can be higher than the sensing voltage Vsen detected at the bottom portion of the display panel 110.

Thus, the temperature compensation factor applied to the sensing voltage Vsen detected at the upper portion of the display panel 110 can be different from the temperature compensation factor applied to the sensing voltage Vsen detected at the bottom portion of the display panel 110.

Here, the process of detecting the sensing voltage Vsen through the reference voltage line RVL by controlling the sensing transistor SENT can be performed in a blank period in which no image is displayed on the display panel 110.

Figure 8:
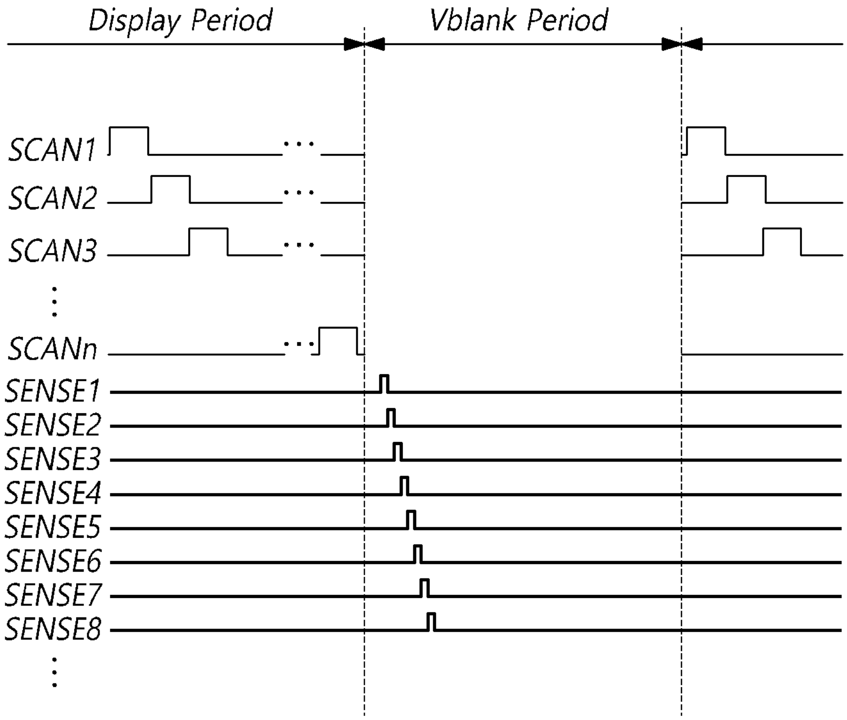
FIG. 8 is a signal waveform diagram illustrating sensing voltages detected through the sensing transistors during a vertical blank period in the display device according to embodiments of the present disclosure.
Figure 9:
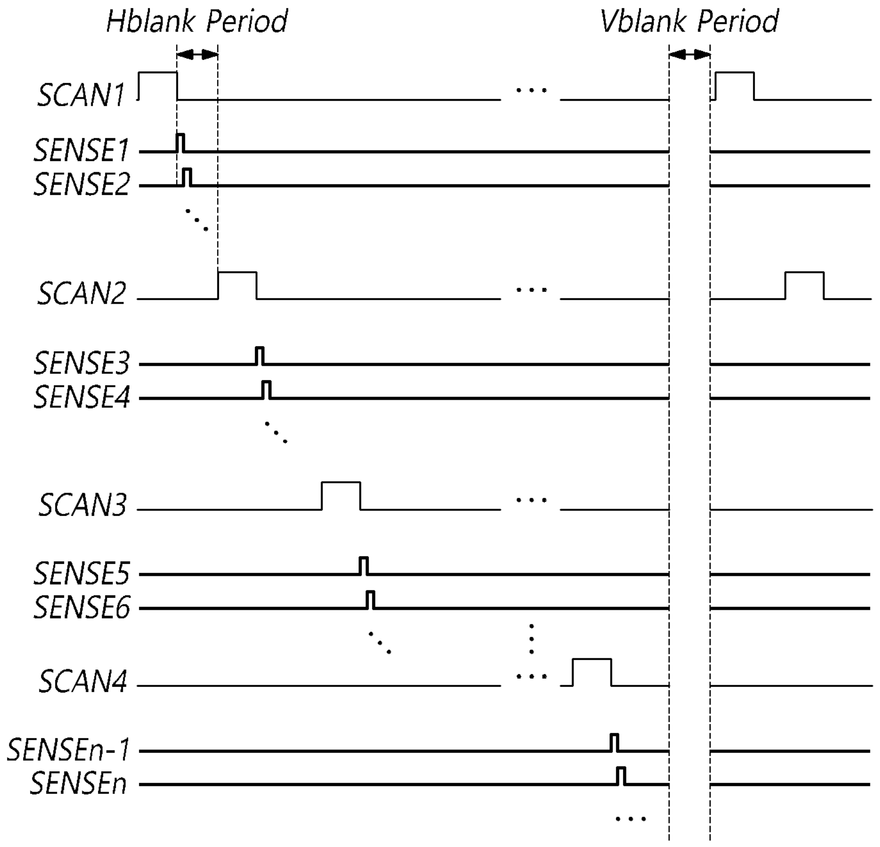
FIG. 9 is a signal waveform diagram illustrating sensing voltages detected through the sensing transistors during a horizontal blank period in the display device according to embodiments of the present disclosure.

FIG. 8 is a signal waveform diagram illustrating sensing voltages detected through the sensing transistors during a vertical blank period in the display device according to embodiments of the present disclosure, and FIG. 9 is a signal waveform diagram illustrating sensing voltages detected through the sensing transistors during a horizontal blank period in the display device according to embodiments of the present disclosure.

Referring to FIGS. 8 and 9, in the display device 100 according to the embodiments, a period in which the sensing voltage Vsen is detected through the reference voltage line RVL at a position at which the sensing transistor SENT is disposed can be a vertical blank period VBlank Period or a horizontal blank period HBlank Period. The vertical blank period VBlank Period can be between a period in which the last scan signal SCANn of one frame is applied and a period in which the first scan signal SCAN1 of the next frame is applied. The horizontal blank period HBlank Period can be between periods in which the scan signal SCAN is sequentially applied for respective gate lines GL.

In general, the vertical blank period VBlank Period is longer than the horizontal blank period HBlank Period. Thus, the number of sensing transistors SENT that can detect the sensing voltage Vsen during the vertical blank period VBlank Period can be greater than that during the horizontal blank period HBlank Period.

FIG. 8 illustrates a case in which the sensing voltage Vsen is detected through eight or more sensing transistors SENT during the vertical blank period VBlank Period. FIG. 9 illustrates a case in which the sensing voltage Vsen is detected through two sensing transistors in respective horizontal blank periods HBlank Period.

Although the period in which the sensing voltage Vsen is detected through the reference voltage line RVL at the position at which the sensing transistor SENT is disposed can correspond to the vertical blank period VBlank Period or the horizontal blank period HBlank Period, the period should not overlap in time with a period in which characteristic values (e.g., a threshold voltage or mobility) of the subpixel SP are detected.

This is because the sensing operation for the characteristic values (e.g., a threshold voltage or mobility) of the subpixel SP can also be performed in the vertical blank period VBlank Period or the horizontal blank period HBlank Period and a sensing voltage for the characteristic values (e.g., a threshold voltage or mobility) of the subpixel SP can also be detected through the reference voltage line RVL.

Figure 10:
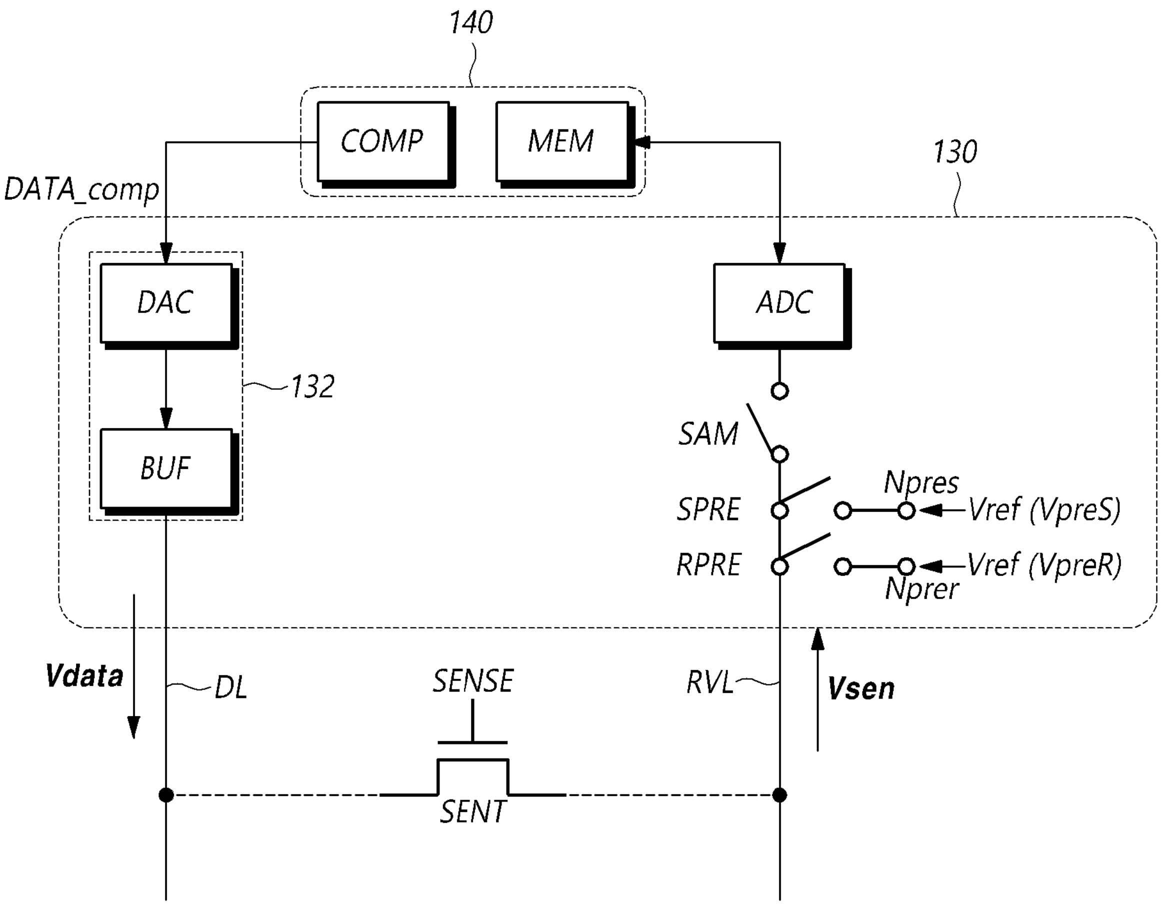
FIG. 10 is an example diagram illustrating a structure for compensating for a data voltage using a sensing voltage detected through the reference voltage line in the display device according to embodiments of the present disclosure.

FIG. 10 is an example diagram illustrating a structure for compensating for a data voltage using a sensing voltage detected through the reference voltage line in the display device according to embodiments of the present disclosure.

Referring to FIG. 10, in the display device 100 according to the embodiments, the data voltage Vdata transferred through a data line DL is required to be sensed through a sensing transistor SENT in order to compensate for the data voltage Vdata by reflecting a change in the temperature of the display panel 110.

In this regard, in the display device 100 according to embodiments, the data voltage Vdata having a predetermined level can be applied to a subpixel SP through the selected data line DL in the blank period. Configurations for turning on the sensing transistor SENT connected to the corresponding data line DL in this state and detecting the sensing voltage Vsen through the reference voltage line RVL can be included.

Specifically, in the display device 100 according to embodiments, in a state in which the first switching transistor T1 and the second switching transistor T2 in a specific subpixel SP are turned off, the sensing transistors SENT around the subpixel SP are selectively turned on.

Afterwards, the data voltage Vdata is supplied through the data line DL connected to a corresponding sensing transistor SENT so as to be transferred through the reference voltage line RVL to which the sensing transistor SENT is connected. In subsequence, the sensing voltage Vsen is detected through the reference voltage line RVL.

In the display device 100 according to embodiments of the present disclosure, the data driving circuit 130 can include a plurality of switches SAM, SPRE, and RPRE to detect a sensing voltage Vsen and an analog-to-digital converter ADC to convert the sensing voltage Vsen into digital sensing data.

The plurality of switches SAM, SPRE, and RPRE can include a sensing reference switch SPRE, a sampling switch SAM controlling the connection between the reference voltage line RVL and the analog-to-digital converter ADC, and a display reference switch RPRE controlling image driving.

The sensing reference switch SPRE is a switch controlling the connection between the reference voltage line RVL and a sensing reference voltage node Npres. The sensing reference switch SPRE allows a sensing reference voltage VpreS to be supplied to the reference voltage line RVL.

The display reference switch RPRE is a switch controlling the connection between the reference voltage line RVL and a reference voltage node Nprer for a display driving operation. The display reference switch RPRE can allow a display reference voltage VpreR to be supplied to the reference voltage line RVL.

During a period in which the sensing voltage Vsen in which the temperature of the display panel 110 is reflected is detected through the sensing transistor SENT, the sensing reference switch SPRE and the display reference switch RPRE can be maintained in a turned-off state.

In the display device 100 according to embodiments of the present disclosure, the timing controller 140 can include a memory system MEM in which sensing data output from the analog-to-digital converter ADC is stored or reference data is stored previously and a compensator COMP calculating compensation data Data_comp by comparing the sensing data and the reference data stored in the memory system MEM. Here, the compensation data calculated by the compensator COMP can be stored in the memory system MEM.

The reference data produced from the entirety of the subpixels SP using a temperature sensor, a camera, or the like before the shipment of the display device 100 can be stored in the memory system MEM. Alternatively, after the shipment of the display device 100, the reference data produced using characteristic values of the subpixels SP sensed during the display driving can be updated and stored.

Here, the reference data stored in the memory system MEM can include temperature compensation factors according to the position and temperature of the display panel 110 and weights.

The compensator COMP can generate the compensation data Data_comp to be supplied to the data driving circuit 130 using the reference data stored in the memory system MEM and output the compensation data Data_comp to the data driving circuit 130. Thus, the data driving circuit 130 converts the compensation data Data_comp into the data voltage Vdata in the form of an analog signal by means of a digital-to-analog converter DAC. The converted data voltage Vdata can be output to the corresponding data line DL through an output buffer BUF.

As a result, the display panel 110 can compensate for a temperature deviation occurring during the driving.

The compensator COMP can be present outside of the timing controller 140, but can be included inside the timing controller 140. The memory system MEM can be located outside of the timing controller 140 or be implemented in the form of a register inside the timing controller 140.

In addition, in the display device 100 according to aspects of the present disclosure, in order to effectively detect the temperature change by means of the sensing transistor SENT, it can be required to form the driving transistor DRT and switching transistors T1 and T2 of the subpixel SP to have a structure insensitive to the temperature change and the sensing transistor SENT for detecting the temperature change of the display panel 110 to have a structure sensitive to the temperature change.

Figure 11:
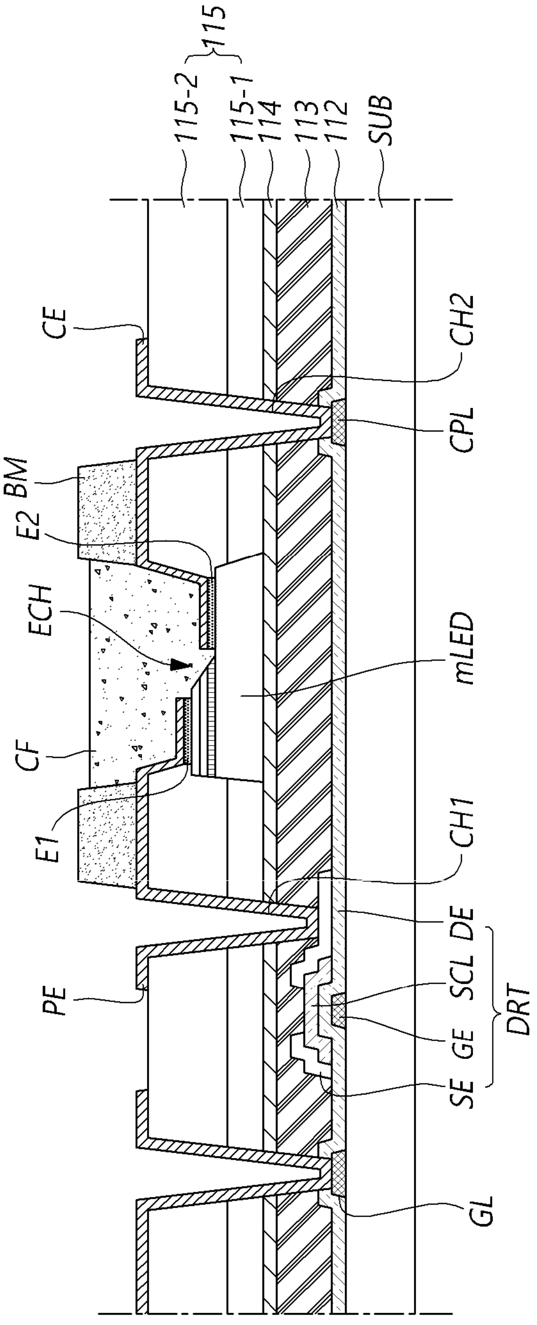
FIG. 11 is a cross-sectional diagram schematically illustrating a subpixel including a micro LED in the display device according to embodiments of the present disclosure.

FIG. 11 is a cross-sectional diagram schematically illustrating a subpixel including a micro LED in the display device according to embodiments of the present disclosure.

Referring to FIG. 11, each of the subpixels SP in the display device 100 according to the embodiments can include a passivation layer 113, a micro LED mLED, a planarization layer 115, a pixel electrode PE, and a common electrode CE.

The thickness of a substrate SUB can be significantly thicker than the entire thickness of a layer structure provided on the substrate SUB. The substrate SUB can be comprised of a plurality of layers or formed by bonding a plurality of substrates.

The subpixel SP can include a driving transistor DRT, a first switching transistor T1, a second switching transistor T2, and a storage capacitor Cst as driving devices. Here, the driving transistor DRT is illustrated as the center.

The driving transistor DRT includes a gate electrode GE, a semiconductor layer SCL, a source electrode SE, and a drain electrode DE.

The gate electrode GE is disposed on the substrate SUB together with a gate line GL. The gate electrode GE is covered with a gate insulating film 112. The gate insulating film 112 can have a single-layer or multilayer structure formed of an inorganic material such as a silicon nitride (SiNx) or a silicon oxide ($SiO_2$).

The semiconductor layer SCL is provided in a predetermined pattern (or in the form of islands) on the gate insulating film 112 to overlap the gate electrode GE. The semiconductor layer SCL can be formed of a semiconductor material comprising one of amorphous silicon, polycrystalline silicon, an oxide, and an organic material.

The source electrode SE is disposed to overlap one side of the semiconductor layer SCL. The source electrode SE is disposed together with the data line DL and the drive voltage line DVL.

The drain electrode DE is disposed to be spaced apart from the source electrode SE while overlapping the other side of the semiconductor layer SCL. The drain electrode DE is disposed together with the source electrode SE, and diverges or protrudes from the adjacent drive voltage line DVL.

The first switching transistor T1 and the second switching transistor T2 can have the same structure as the driving transistor DRT.

The passivation layer 113 is provided on the front surface of the substrate SUB. The passivation layer 113 provides a planarized surface while protecting the subpixel SP. The passivation layer 113 can be formed of an organic material such as benzocyclobutene or photo acrylic. The passivation layer 113 can be formed of photo acrylic for the convenience of processing.

The micro LED mLED can be disposed on the passivation layer 113 using a bonding material 114. Alternatively, the micro LED mLED can be disposed in a concave portion provided on the passivation layer 113. An incline caused by the concave portion in the passivation layer 113 can guide light generated by the micro LED mLED in a specific direction, thereby improving emission efficiency.

The micro LED mLED is electrically connected to a common power line CPL through which the base voltage EVSS is transferred. The micro LED mLED generates light in response to a current flowing from the driving transistor DRT toward the common power line CPL.

The micro LED mLED includes an emitting layer EL, a first electrode (or an anode) E1, and a second electrode (or a cathode) E2.

The micro LED mLED generates light in response to recombination of electrons and holes in response to current flowing between the first electrode E1 and the second electrode E2.

The planarization layer 115 is disposed on the passivation layer 113 to cover the micro LED mLED. For example, the planarization layer 115 is disposed on the passivation layer 113 to have a thickness capable of covering all of areas in which the passivation layer 113 and the micro LED mLED are disposed.

The planarization layer 115 can be implemented as a single layer or have a multilayer structure comprised of a first planarization layer 115-1 and a second planarization layer 115-2 as illustrated in FIG. 11.

The planarization layer 115 as described above provides a planar surface on the passivation layer 113. The planarization layer 115 also serves to fix the position of the micro LED mLED.

The pixel electrode PE is an electrode line connecting the first electrode E1 of the micro LED mLED to the drain electrode DE of the driving transistor DRT. The pixel electrode PE can be connected to the source electrode SE depending on the configuration of the thin film transistor DRT.

The pixel electrode PE is provided on a top surface of the planarization layer 115 overlapping the first electrode E1 and the driving transistor DRT. The pixel electrode PE is electrically connected to the drain electrode DE or the source electrode SE of the driving transistor DRT through a first contact hole CH1 extending through the passivation layer 113 and the planarization layer 115. In addition, the pixel electrode PE is electrically connected to the first electrode E1 of the micro LED mLED through an electrode contact hole ECH provided in the planarization layer 115.

Thus, the first electrode E1 of the micro LED mLED is electrically connected to the drain electrode DE or the source electrode SE of the driving transistor DRT through the pixel electrode PE.

Although the drain electrode DE is illustrated as being connected to the pixel electrode PE in the connection relationship of the source electrode SE and the drain electrode DE, a configuration of connecting the pixel electrode PE to the source electrode SE can be provided as an option of those skilled in the art.

When the display device 100 has a top emission structure, the pixel electrode PE can be formed of a transparent conductive material. When the display device 100 has a bottom emission structure, the pixel electrode PE can be formed of a light reflecting conductive material.

Here, the transparent conductive material can be indium tin oxide (ITO), indium zinc oxide (IZO), or the like, but is not limited thereto.

The light reflecting conductive material can be Al, Ag, Au, Pt, Cu, or the like, but is not limited thereto. The pixel electrode PE formed of the light reflecting conductive material can be a single layer including the light reflecting conductive material or a multilayer formed by stacking the single layers.

The common electrode CE is an electrode line electrically connecting the second electrode E2 of the micro LED mLED and the common power line CPL. The common electrode CE is provided on a top surface of the planarization layer 115 overlapping the common power line CPL while overlapping the second electrode E2 of the micro LED mLED. Here, the common electrode CE can be formed of the same material as the pixel electrode PE.

One side of the common electrode CE is electrically connected to the common power line CPL through a second contact hole CH2 extending through the gate insulating film 112, the passivation layer 113, and the planarization layer 115 to overlap the common power line CPL. The other side of the common electrode CE is electrically connected to the second electrode E2 of the micro LED mLED through the electrode contact hole ECH formed in the planarization layer 115 to overlap the second electrode E2 of the micro LED mLED. Thus, the second electrode E2 of the micro LED mLED is electrically connected to the common power line CPL through the common electrode CE.

The pixel electrode PE and the common electrode CE can be formed simultaneously by a deposition process of depositing an electrode material over the planarization layer 115 including the first and second contact holes CH1 and CH2 and the electrode contact hole ECH and an electrode patterning process including photolithography and etching. Thus, in the display device 100, the pixel electrode PE and the common electrode CE connected to the micro LED mLED can be disposed at the same time. Consequently, electrode connecting processing can be simplified and a processing time required for connecting the micro LED mLED to the electrode lines can be significantly reduced, thereby improving productivity.

The micro LED mLED mounted on each of the subpixels SP can be fixed using the bonding material 114.

Alternatively, a color filter CF, i.e., a color conversion layer, can be disposed over the micro LED mLED mounted on each of the subpixels SP. In this case, the substrate SUB can include a color filter CF and a black matrix BM overlapping each of the subpixels SP.

For example, a blue micro LED mLED generating a blue wavelength can be disposed in the subpixel SP, and quantum dot particles can be mixed to the color filter CF used as a color conversion layer.

Depending on the material and the structure used, the operating characteristics of the driving transistor DRT and the switching transistors T1 and T2 included in the subpixel SP structure can vary sensitive or insensitive to the temperature change.

For example, changes in the characteristics according to the temperature change can vary according to the material of the gate insulating film 112 provided over the gate electrode GE of the thin film transistor.

Figure 12:
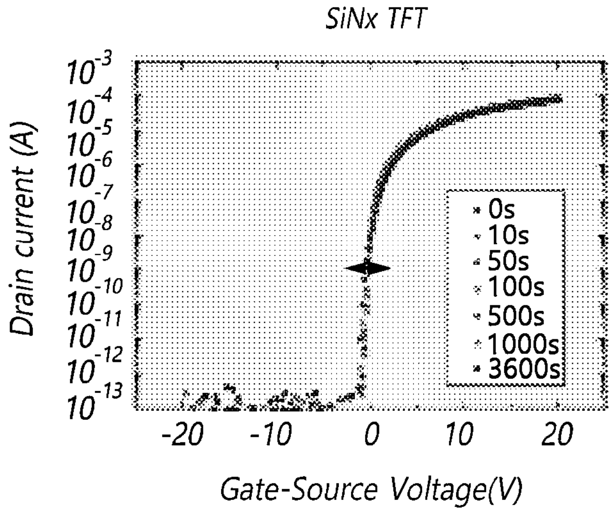
FIG. 12 is a graph illustrating operating characteristics in a case in which the gate insulating film of the thin film transistor is formed of a silicon nitride.
Figure 13:
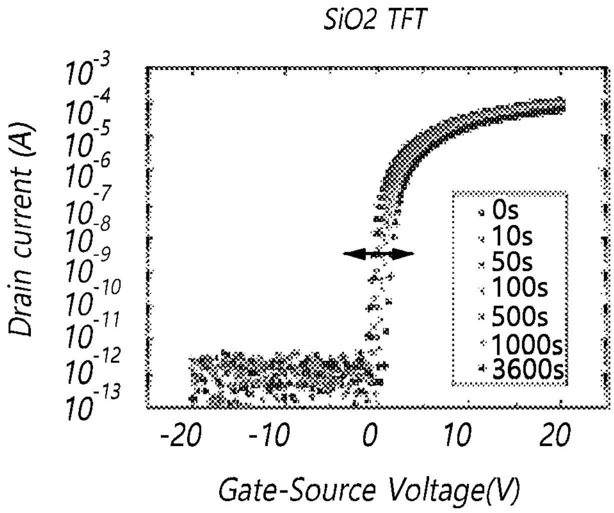
FIG. 13 is a graph illustrating operating characteristics in a case in which the gate insulating film of the thin film transistor is formed of a silicon oxide.

FIG. 12 is a graph illustrating operating characteristics in a case in which the gate insulating film of the thin film transistor is formed of a silicon nitride, and FIG. 13 is a graph illustrating operating characteristics in a case in which the gate insulating film of the thin film transistor is formed of a silicon oxide. In addition, FIG. 14 is a graph illustrating changes in the threshold voltage Vth according to changes in the temperature, measured from a case in which the gate insulating film is formed of a silicon nitride and a case in which the gate insulating film is formed of a silicon oxide.

Referring to FIG. 12, when the gate insulating film 112 formed over the gate electrode GE of the thin film transistor is formed of a silicon nitride (SiNx), an electron trap layer having a high bonding density is formed between the gate insulating film 112 and the semiconductor layer SCL. As a result, a gate-source voltage is maintained substantially the same even when the temperature changes.

In contrast, referring to FIG. 13, when the gate insulating film 112 formed over the gate electrode GE of the thin film transistor is formed of a silicon oxide ($SiO_2$), charges moving from the semiconductor layer SCL to the gate insulating film 112 can be easily redistributed in the gate insulating film 112. Thus, the gate-source voltage significantly changes according to the temperature change.

Figure 14:
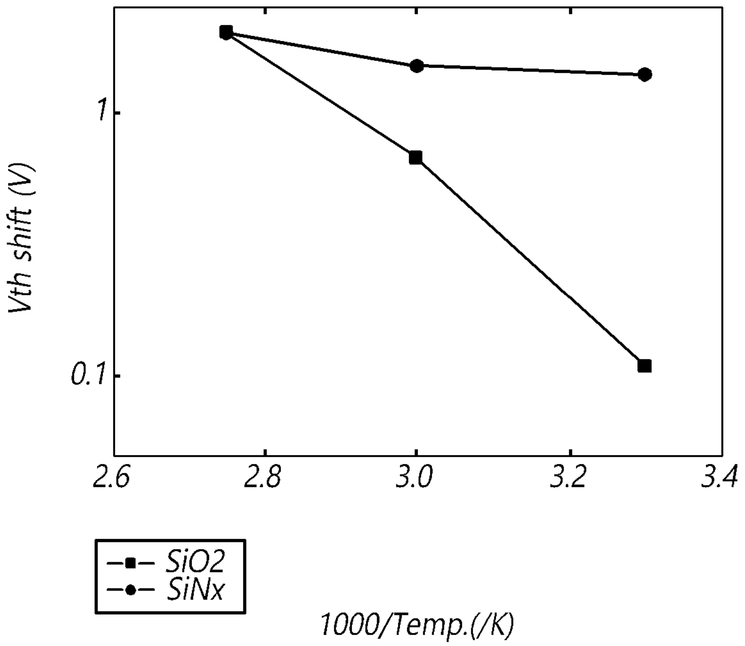
FIG. 14 is a graph illustrating changes in the threshold voltage Vth according to changes in the temperature, measured from a case in which the gate insulating film is formed of a silicon nitride and a case in which the gate insulating film is formed of a silicon oxide.

Referring to FIG. 14, in the thin film transistor in which the gate insulating film 112 provided over the gate electrode GE is formed of the silicon nitride (SiNx), the threshold voltage Vth has substantially no change according to the temperature. In contrast, it can be viewed that, in the thin film transistor in which the gate insulating film 112 provided over the gate electrode GE is formed of the silicon oxide ($SiO_2$), the threshold voltage Vth significantly changes according to the temperature.

In consideration of these features, in the display device 100 according to the present disclosure, the gate insulating film 112 of the transistors (e.g., the driving transistor, the first switching transistor, and the second switching transistor) of the subpixel SP can be formed of the silicon nitride (SiNx) insensitive to the temperature change, and the gate insulating film 112 of the sensing transistor SENT disposed around the subpixel SP can be formed of the silicon oxide ($SiO_2$) sensitive to the temperature change.

In addition, changes in the characteristics according to the temperature change can vary according to the structure of the gate electrode GE of the thin film transistor.

Figure 15:
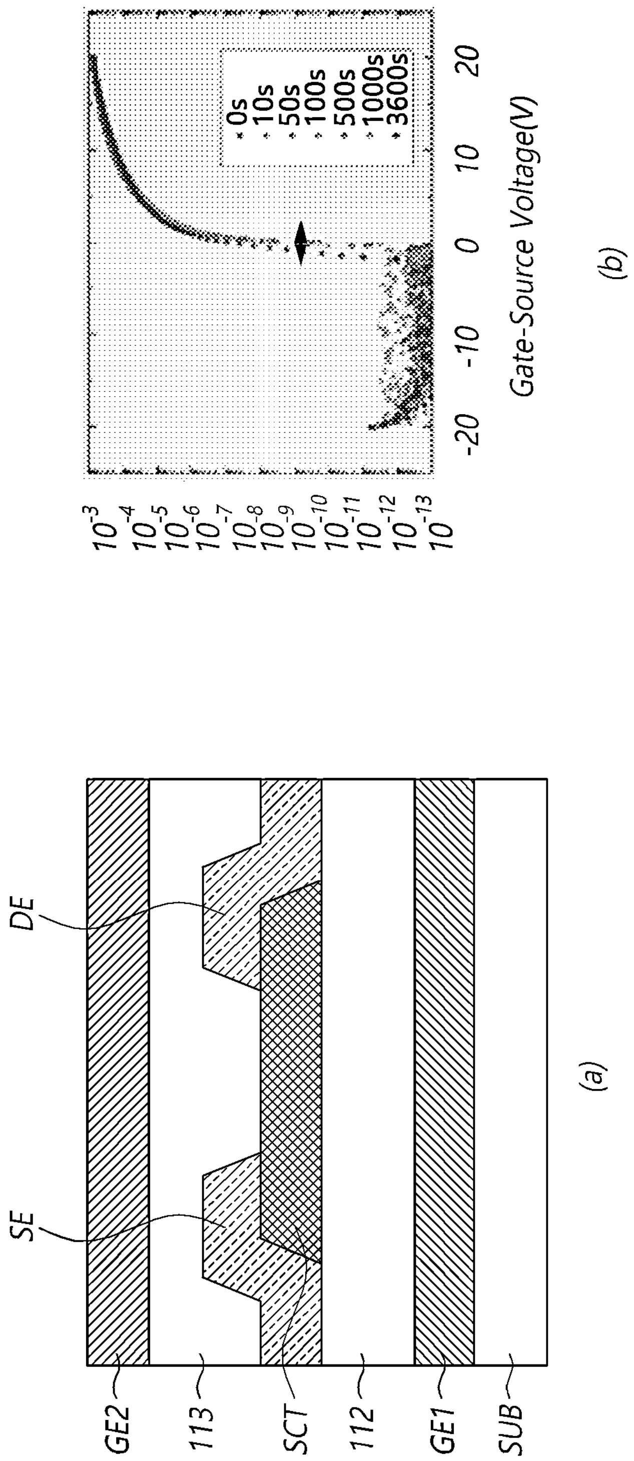
FIG. 15 illustrates a cross-section of a thin film transistor having a double gate electrode structure and operating characteristics of the thin film transistor.
Figure 16:
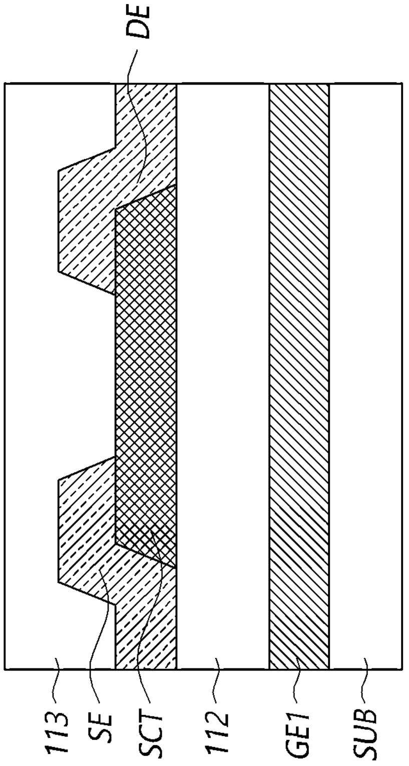
FIG. 16 illustrates a cross-section of a thin film transistor having a single gate electrode structure and operating characteristics of the thin film transistor.
Figure 16:
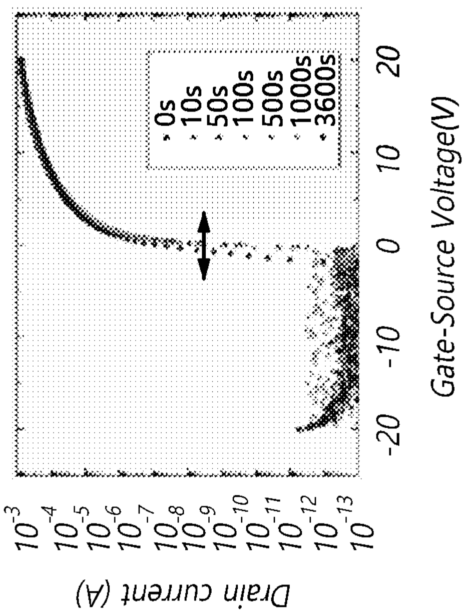

Further, (a) and (b) of FIG. 15 illustrate a cross-section of a thin film transistor having a double gate electrode structure and operating characteristics of the thin film transistor, and (a) and (b) of FIG. 16 illustrate a cross-section of a thin film transistor having a single gate electrode structure and operating characteristics of the thin film transistor.

Referring to FIGS. 15 and 16, the thin film transistor can have a single gate electrode structure in which a single gate electrode GE is disposed below a semiconductor layer SCT or a double gate electrode structure including a first gate electrode GE1 disposed below the semiconductor layer SCT and a second gate electrode GE2 disposed above the semiconductor layer SCT.

The semiconductor layer SCT and a gate electrode GE (GE1) disposed below the semiconductor layer SCT can be insulated by means of the gate insulating film 112. In addition, the semiconductor layer SCT and a gate electrode GE2 disposed above the semiconductor layer SCT can be insulated by means of the drain electrode, the source electrode, and the passivation layer 113.

Here, in the thin film transistor having a double gate electrode structure, a bias action caused by the lower first gate electrode GE1 and a bias action caused by the upper second gate electrode GE2 can be canceled out by each other.

Thus, when an electric field is generated between the semiconductor layer SCT and the gate electrode GE (GE1) disposed below the semiconductor layer SCT, the strength of the electric field of the single gate electrode structure is greater than the strength of the electric field of the double gate electrode structure.

As a result, the thin film transistor of the single gate electrode structure has greater changes in the threshold voltage according to the temperature change than the thin film transistor of the double gate electrode structure.

In consideration of these features, in the display device 100 according to the present disclosure, the transistors (e.g., the driving transistor, the first switching transistor, and the second switching transistor) of a subpixel SP can have a double gate electrode structure insensitive to the temperature change, while the sensing transistors SENT disposed around the subpixel SP can have a single gate electrode structure sensitive to the temperature change.

In addition, changes in the characteristics according to the temperature change can vary according to the layer-stacking structure of the thin film transistor.

Figure 17:
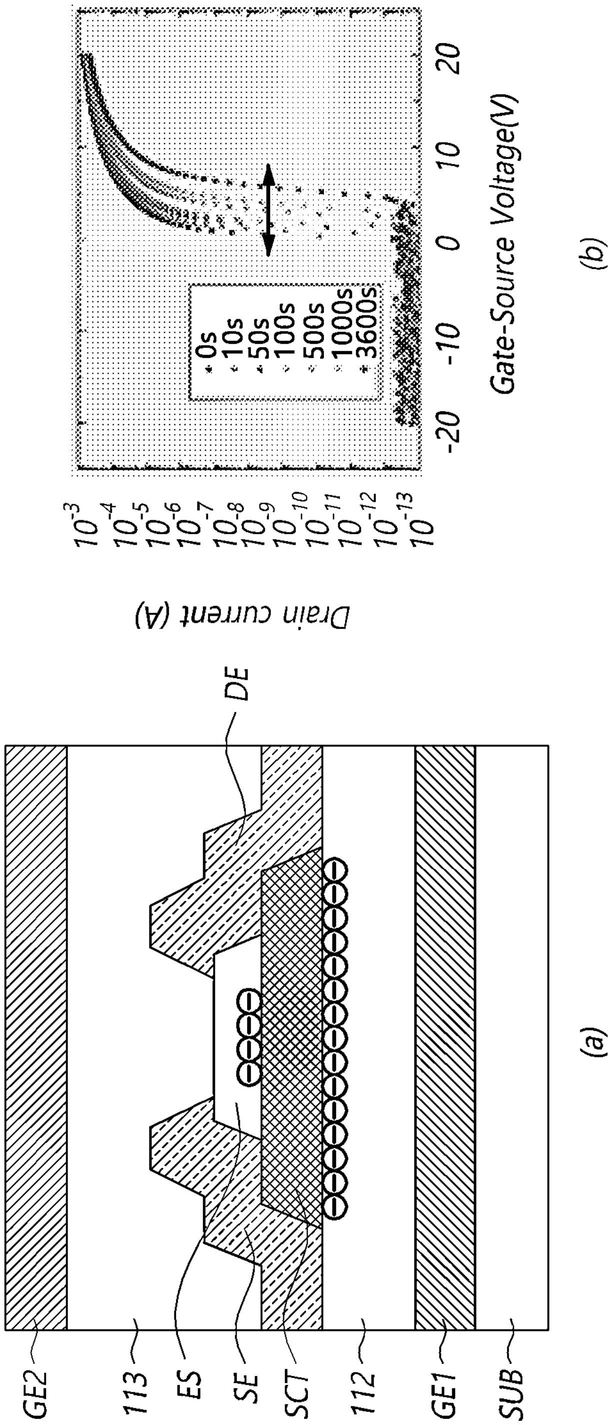
FIG. 17 illustrates a cross-section of a thin film transistor having a double gate electrode structure including an etch stopper and operating characteristics of the thin film transistor.
Figure 18:
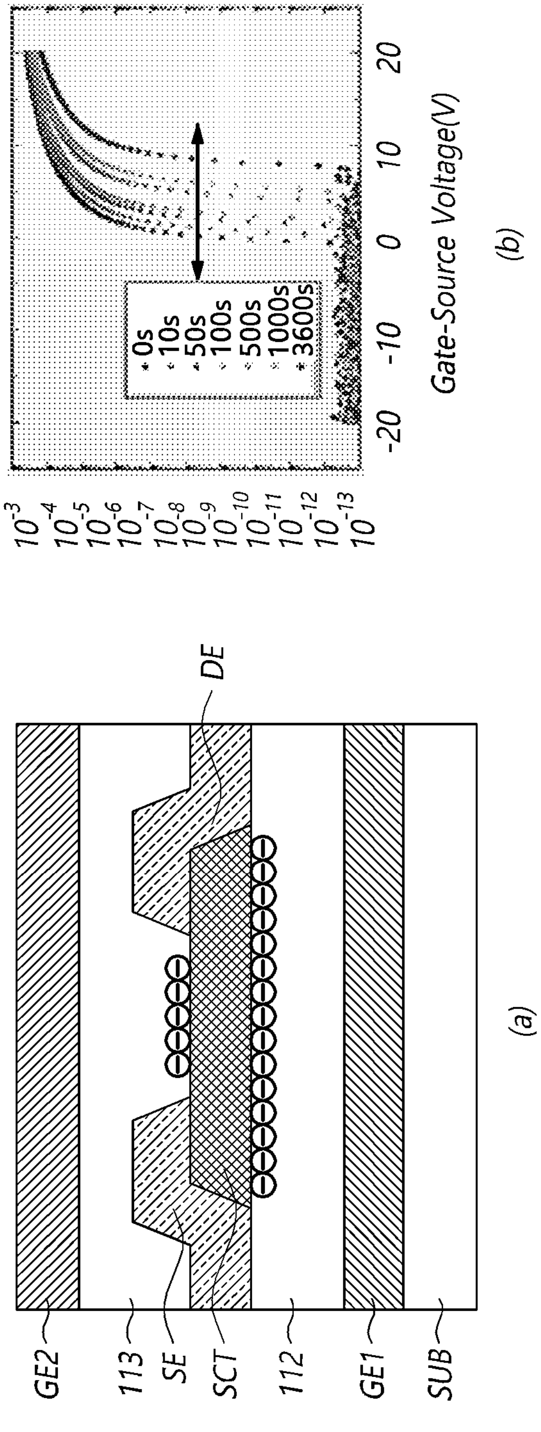
FIG. 18 illustrates a cross-section of a thin film transistor having a double gate electrode structure without an etch stopper and operating characteristics of the thin film transistor.

Here, (a) and (b) of FIG. 17 illustrate a cross-section of a thin film transistor having a double gate electrode structure including an etch stopper and operating characteristics of the thin film transistor, and (a) and (b) of FIG. 18 illustrate a cross-section of a thin film transistor having a double gate electrode structure without an etch stopper and operating characteristics of the thin film transistor.

Referring to FIGS. 17 and 18, the thin film transistor can have an etch stopper ES over the semiconductor layer SCT to protect the semiconductor layer SCT in order to prevent the semiconductor layer SCT from being etched during the fabrication process of the thin film transistor.

In general, the etch stopper ES is formed of a silicon oxide film ($SiO_2$). The etch stopper ES can be formed from deposition gases of mono silane ($SiH_4$) and nitrogen dioxide ($N_2O$) using plasma enhanced chemical vapor deposition (PECVD) equipment.

In addition, since the driving transistor DRT of the subpixel SP serves to supply constant current to the micro LED mLED, reliability in a positive gate bias thermal stress (PBTS) situation is required.

However, in the PBTS situation, electrons can be trapped in the upper portion of the semiconductor layer SCT or injected into the gate insulating film 112, and holes in the semiconductor layer SCT can be increased. Electrons trapped in the upper portion of the semiconductor layer SCT or injected into the gate insulating film 112 cancel the electric fields generated by the upper second gate electrode GE2 and the lower first gate electrode GE1, and the threshold voltage can be shifted in the positive direction due to holes remaining in the semiconductor layer SCT.

However, in the structure in which the etch stopper ES is formed over the semiconductor layer SCT, a portion of the electric field of the upper second gate electrode GE2 can be blocked by the etch stopper ES and the source and drain electrodes SE and DE having an increased thickness. The thickness of portions of the source and drain electrodes SE and DE on sides of semiconductor layer SCT is increased due to the etch stopper ES. As a result, electrons trapped in the upper portion of the semiconductor layer SCT or injected into the gate insulating film 112 due to the upper second gate electrode GE2 can be reduced, and holes remaining in the semiconductor layer SCT can be reduced. Thus, the cancellation of the electric field of the upper second gate electrode GE2 by electrons trapped in the upper portion of the semiconductor layer SCT or injected into the gate insulating film 112 can be reduced, and the shift of the threshold voltage in the positive direction can be reduced.

Accordingly, changes in the threshold voltage of the thin film transistor including the etch stopper ES are insignificant, but changes in the threshold voltage of the thin film transistor not including the etch stopper ES can be significant.

In consideration of these features, in the display device 100 according to the present disclosure, the transistors (e.g., the driving transistor, the first switching transistor, and the second switching transistor) of a subpixel SP can have a structure without an etch stopper, while the sensing transistors SENT disposed around the subpixel SP can have a structure including the etch stopper ES.

Although the micro LED display device using the micro LEDs mLED as light-emitting elements has been described above as an example, the same can be applied to display devices using other light-emitting elements than the micro LEDs mLED.

The above-described embodiments of the present disclosure will be briefly reviewed as follows.

A display device 100 according to aspect of the present disclosure can include a display panel 110 including a plurality of subpixels SP in which a gate line GL, a data line DL, and a reference voltage line RVL are disposed; a gate driving circuit 120 configured to supply a scan signal SCAN to the gate line GL; a data driving circuit 130 configured to convert image data DATA into a data voltage Vdata and supply the data voltage Vdata to the data line DL; and a timing controller 140 configured to control the gate driving circuit 120 and the data driving circuit 130 and generating compensation data Data_comp for the image data DATA using a sensing voltage Vsen detected through the reference voltage line RVL. The display panel 110 can include a plurality of sensing transistors SENT disposed around the plurality of subpixels SP to connect the data line DL and the reference voltage line RVL.

Each of the subpixels SP can include a light-emitting element, a driving transistor DRT configured to transfer a drive current to the light-emitting element, one or more switching transistors T1 and T2 configured to control the operation of the driving transistor DRT, and a storage capacitor Cst configured to maintain the voltage of the driving transistor DRT.

The light-emitting element can be a micro light-emitting diode (micro LED).

In the driving transistor DRT and the one or more switching transistors T1 and T2, a gate insulating film 112 can be formed of a silicon nitride (SiNx) film.

Each of the driving transistor DRT and the one or more switching transistors T1 and T2 can have a double gate electrode structure including a first gate electrode GE1 disposed below the semiconductor layer SCT and a second gate electrode GE2 disposed above the semiconductor layer SCT.

Each of the driving transistor DRT and the one or more switching transistors T1 and T2 can include an etch stopper ES on top of the semiconductor layer SCT to protect the semiconductor layer SCT.

The plurality of sensing transistors SENT can be disposed to surround the corresponding subpixel SP.

Each of the plurality of sensing transistors SENT can have a drain node connected to the data line DL and a source node connected to the reference voltage line RVL, and the operation of the sensing transistors SENT can be controlled by a sense signal SENSE applied to a gate node.

The plurality of sensing transistors SENT can be disposed in respective subpixels among the plurality of subpixels so as to be electrically separated from adjacent subpixels among the plurality of subpixels.

Adjacent sensing transistors among the plurality of sensing transistors SENT can share the data line DL or the reference voltage line RVL located at center.

Each of the plurality of sensing transistors SENT includes a gate insulating film 112 formed of a silicone oxide ($SiO_2$) film.

Each of the plurality of sensing transistors SENT can have a single gate electrode structure including a single gate electrode disposed below the semiconductor layer SCT.

The plurality of sensing transistors SENT can be turned on during a vertical blank period or a horizontal blank period to transfer the data voltage Vdata supplied through the data line DL to the reference voltage line RVL.

The plurality of sensing transistors SENT can be turned on not to overlap a period for sensing characteristic values of the corresponding subpixel.

The timing controller 140 can generate the compensation data Data_comp using reference data stored in a memory system MEM by converting the sensing voltage Vsen detected through the reference voltage line RVL into a temperature value and applying a temperature compensation factor to the temperature value.

The value of the temperature compensation factor in an area adjacent to the data driving circuit 130 can be different from value of the temperature compensation factor in an area located away from the data driving circuit 130.

A display panel 110 according to an aspect of the present disclosure can include a gate line GL through which a scan signal SCAN is supplied; a data line DL through which a data voltage Vdata is supplied; a reference voltage line RVL through which a reference voltage Vref is supplied; a subpixel SP including a light-emitting element and a driving transistor DRT transferring a driving current to the light-emitting element; and a plurality of sensing transistors SENT disposed around the subpixel SP to connect the data line DL and the reference voltage line RVL.

The above description has been presented to enable any person skilled in the art to make and use the technical idea of the present invention, and has been provided in the context of a particular application and its requirements. Various modifications, additions and substitutions to the described embodiments will be readily apparent to those skilled in the art, and the general principles defined herein can be applied to other embodiments and applications without departing from the spirit and scope of the present invention. The above description and the accompanying drawings provide an example of the technical idea of the present invention for illustrative purposes only. For example, the disclosed embodiments are intended to illustrate the scope of the technical idea of the present invention.

What is claimed is:

1. A display device comprising:

a display panel including a plurality of subpixels, a gate line, a data line, and a reference voltage line;

a gate driving circuit configured to supply a scan signal to the gate line;

a data driving circuit configured to convert image data into a data voltage and supply the data voltage to the data line; and a timing controller configured to control the gate driving circuit and the data driving circuit, and generate compensation data for the image data using a sensing voltage detected through the reference voltage line, wherein the display panel includes a plurality of sensing transistors disposed around the plurality of subpixels to connect the data line and the reference voltage line.

2. The display device according to claim 1, wherein each of the plurality of subpixels includes:

a light-emitting element;

a driving transistor configured to transfer a drive current to the light-emitting element;

one or more switching transistors configured to control an operation of the driving transistor; and a storage capacitor configured to maintain a voltage of the driving transistor.

3. The display device according to claim 2, wherein the light-emitting element is a micro light-emitting diode.

4. The display device according to claim 2, wherein each of the driving transistor and the one or more switching transistors includes a gate insulating film including silicon nitride.

5. The display device according to claim 2, wherein each of the driving transistor and the one or more switching transistors has a double gate electrode structure, and the double gate electrode structure includes:

a first gate electrode disposed below a semiconductor layer; and a second gate electrode disposed above the semiconductor layer.

6. The display device according to claim 2, wherein each of the driving transistor and the one or more switching transistors includes an etch stopper on top of a semiconductor layer to protect the semiconductor layer.

7. The display device according to claim 1, wherein the plurality of sensing transistors are disposed to surround the plurality of subpixels.

8. The display device according to claim 1, wherein the plurality of sensing transistors comprise a drain node connected to the data line and a source node connected to the reference voltage line, and the plurality of sensing transistors are controlled by a sense signal applied to a gate node.

9. The display device according to claim 1, wherein the plurality of sensing transistors are disposed in respective subpixels among the plurality of subpixels so as to be electrically separated from adjacent subpixels among the plurality of subpixels.

10. The display device according to claim 1, wherein adjacent sensing transistors among the plurality of sensing transistors share the data line or the reference voltage line.

11. The display device according to claim 1, wherein each of the plurality of sensing transistors includes a gate insulating film including silicone oxide.

12. The display device according to claim 1, wherein each of the plurality of sensing transistors includes a single gate electrode structure having a single gate electrode disposed below a semiconductor layer.

13. The display device according to claim 1, wherein the plurality of sensing transistors are turned on during a vertical blank period or a horizontal blank period to transfer the data voltage supplied through the data line to the reference voltage line.

14. The display device according to claim 13, wherein the plurality of sensing transistors are turned on not to overlap a period for sensing a characteristic value of the plurality of subpixels.

15. The display device according to claim 13, wherein the timing controller converts the sensing voltage detected through the reference voltage line into a temperature value by using reference data stored in a memory system, and generates the compensation data by applying a temperature compensation factor to the temperature value.

16. The display device according to claim 15, wherein a value of the temperature compensation factor in an area adjacent to the data driving circuit is different from a value of the temperature compensation factor in an area located away from the data driving circuit.

17. A display device comprising:

a gate line configured to supply a scan signal;

a data line configured to supply a data voltage;

a reference voltage line configured to supply a reference voltage;

a subpixel including a light-emitting element and a driving transistor configured to transfer a driving current to the light-emitting element; and a plurality of sensing transistors disposed around the subpixel to connect the data line and the reference voltage line.

18. The display device according to claim 17, wherein the light-emitting element is a micro light-emitting diode.

* * * * *